US005099193A

United States Patent [19]

Moseley et al.

[11] Patent Number: 5,099,193

[45] Date of Patent: Mar. 24, 1992

[54] REMOTELY CONTROLLABLE POWER CONTROL SYSTEM

[75] Inventors: Robin Moseley, Allentown; Joel S. Spira, Coopersburg, both of Pa.; Arjuna Karunaratne, Santa Clara, Calif.; John Wylie, Allentown; Jonathan A. Barney, Whitehall, both of Pa.

[73] Assignee: Lutron Electronics Co., Inc., Coopersburg, Pa.

[21] Appl. No.: 332,317

[22] Filed: Mar. 31, 1989

Related U.S. Application Data

[63] Continuation-in-part of Ser. No. 79,847, Jul. 30, 1987.

[51] Int. Cl.[5] .......... H02J 1/00

[52] U.S. Cl. .......... 323/324; 323/905; 315/291; 340/825.72; 359/142

[58] Field of Search .......... 323/239, 324, 325, 326, 323/327, 905, 909; 307/112, 113, 114–116, 125; 315/158, 291, DIG. 4; 200/5 B, 536, 5 E; 361/160; 364/492, 493; 340/825.69, 825.72; 341/176; 358/194.1; 455/603

[56] References Cited

U.S. PATENT DOCUMENTS

| | | | |
|---|---|---|---|
| 3,924,120 | 12/1975 | Cox, III | 455/603 |
| 4,386,436 | 5/1983 | Kocher et al. | 340/531 X |
| 4,388,566 | 6/1983 | Bedard et al. | 315/291 |
| 4,388,567 | 6/1983 | Yamazaki et al. | 315/291 |
| 4,523,128 | 6/1985 | Stamm et al. | 315/291 |
| 4,563,592 | 1/1986 | Yuhasz et al. | 323/905 X |
| 4,621,992 | 11/1986 | Angott | 340/825.72 X |
| 4,678,985 | 7/1987 | Moskin | 323/324 |
| 4,684,822 | 8/1987 | Angott | 340/825.72 X |
| 4,686,380 | 8/1987 | Angott | 315/158 X |

*Primary Examiner*—Steven L. Stephan
*Assistant Examiner*—Kristine Peckman
*Attorney, Agent, or Firm*—Seidel, Gonda, Lavorgna & Monaco

[57] ABSTRACT

A remotely controllable power control system wherein the power supplied to a load may be varied locally via an actuator, positionable through a continuous range, on a wall control or from a remote location using a remote control device not electrically wired to the wall control. The load control system includes a transmitter and a wall control/receiver, each having a control actuator for adjusting the power supplied to the load. Control can be obtained by either the transmitter or the wall control/receiver immediately upon manipulation of either control actuator, with the adjustment in power level occurring substantially instantaneously. Communication between the transmitter and the wall control/receiver is by digitally encoded infrared signal.

96 Claims, 15 Drawing Sheets

BLOCK DIAGRAM OF CIRCUIT IN HIGH POWER CAN

BLOCK DIAGRAM OF LOCAL CONTROL STATIONS

MANUAL CONTROL STATION SCHEMATIC

REMOTELY CONTROLLABLE POWER CONTROL SYSTEM

CROSS-REFERENCE TO PRIOR APPLICATION

This application is a continuation-in-part of copending U.S. application Ser. No. 079,847, filed July 30, 1987.

This invention relates to an electrical control system, and more particularly to a novel, wireless, electrical load control system wherein control of the power supplied to a load may be varied from a remote location using a remote control device not electrically wired to the load.

Although the invention is described with reference to control of lighting levels, it has application in other areas such as the control of sound volume, tone or balance; video brightness or contrast; the tuning setting of a radio or television receiver; and the position, velocity or acceleration of a movable object.

Load control systems are known in which the power supplied to the load can be adjusted by control units mounted at one or more different locations remote from the power controller. The control units are typically connected to the controller using two or three electrical wires in the structure in which the load control system is used. In an advanced version of such systems, control is transferred between different locations immediately upon manipulation of a control switch without the need for any additional overt act by the user. See, for instance, U.S. Pat. No. 4,689,547, issued Aug. 25, 1987 to Rowen et al.

To permit greater user flexibility and to permit installation of a load control system with no modification of the existing wiring system in the structure, load control systems have been modified to incorporate wireless remote control units. For example, a known type of light dimming system uses a power controller/receiver and a remote control transmitter for transmitting a control signal by radio, infrared, ultrasonic or microwave to the power controller/receiver. In such a system, it is only possible to cause the light level to be raised or lowered at a predetermined fixed rate and it is not possible to select a particular light level directly either via the transmitter or an actuator, positionable through a continuous range, on the controller/receiver, nor is there any visual indication at the transmitter or controller/receiver of the light level selected. In such a system, a lag of two to ten seconds typically exists between actuation of the transmitter and achievement of the desired light level. Especially at the higher end of the range, this lag tends to limit the commercial acceptability of such systems.

Alternative load control systems have been produced that incorporate wireless remote controls where the desired light level is reached instantaneously on operation of the remote control unit. Unfortunately, these systems only allow the selection of three or four light levels that have been previously programmed at the power controller/receiver; usually it is not possible to select one of an essentially continuous range of values via either the transmitter or an actuator, positionable through a continuous range, on the controller/receiver.

In the case of the systems using radio waves for the control signal transmission medium, the transmitter is often larger than is commercially desirable so as to accommodate the radio transmitting system, and an antenna must frequently be hung from the controller/receiver.

Remote control systems are frequently incorporated in television sets. In these systems a switch on the transmitter must typically be maintained in a depressed position until the desired load level, e.g., volume, is reached, with a time lag typically existing between the depression of the switch and achievement of the desired load level. Model airplanes are typically controlled by remote radio control where a control signal is typically continually transmitted during the operation of the airplane. It is possible, however, to select the control signal from an essentially continuous range of values.

Generally, in the known wireless remote load control systems, change in the power input to the load does not substantially instantaneously track with adjustment of the remote control transmitter except as noted above. Also, the existing systems typically do not have control actuators on either the transmitter or power controller/receiver with means for conferring control respectively on either the transmitter or power controller/receiver immediately upon manipulation of the control actuators of either. Also the existing systems do not incorporate actuator, positionable through a continuous range, on either the transmitter or the controller/receiver for selecting, from an essentially continuous range of levels, the power delivered to a load.

In describing the range of a receiver, it is useful to consider the receiving beam-width. Beam-width measures the maximum angular response of a receiver. Beam-width can be measured in any convenient plane which intersects the receiver, but the horizontal and vertical planes are generally most useful. As referred to herein, the beam-width measures the included angle between which the range is greater than 20% of maximum range.

Prior art systems generally strive to maximize beam-width in all planes. However, most wall-mounted wireless, remote systems operate in a relatively restricted range due to the confines of a ceiling and a floor. Thus, a large vertical beam-width does not significantly increase usable range and may increase interference from ceiling-mounted light sources.

A primary object of the present invention is to provide a remote, wireless load control system incorporating a wireless remote control device wherein power supplied to the load is adjusted through a continuous range of values immediately as the control actuator of the wireless remote control device is manipulated, and wherein the control signal need not be continually transmitted.

Another object of the present invention is to provide a wireless, remote, electrical load control system having a power controller, a receiver, a control station, and a transmitter designed so that upon manipulation of the control actuator on the control station or the transmitter, control can be obtained by either the control station or transmitter substantially instantaneously, without the need for any additional overt act by the user.

Another object of the present invention is to provide a remotely controllable power control system having a transmitter and a wall control/receiver comprising an actuator, positionable through a continuous range, and a power controller, designed so that power delivered to a load can be set by either the actuator on the wall control/receiver or an actuator on the transmitter.

Another object of the present invention is to provide a remotely controllable power control system having a transmitter and a wall control/receiver comprising an actuator, positionable through a continuous range, and a power controller, designed so that upon manipulation of either the actuator on the wall control/receiver or an actuator on the transmitter; control can be obtained, respectively, by the wall control/receiver or the transmitter instantaneously without the need for any additional overt act by the user.

Another object of the present invention is to provide a remotely controllable power control system having a transmitter and a wall control/receiver comprising an actuator, positionable through a continuous range, and a power controller, designed so that power delivered to a load can be adjusted through an essentially continuous range of levels via manipulation of either the actuator on the wall control/receiver or an actuator on the transmitter.

Another object of the present invention is to provide a remotely controllable power control system having a transmitter and a wall control/receiver comprising a lens, a detector, and a power controller, wherein the lens is designed to maximize usable range and to minimize interference from ceiling-mounted and other light sources.

To achieve these and other objects, the invention generally comprises a novel wireless remote control dimmer system for controlling application of alternating current to a load. The system includes a power controller for varying the power supplied to the load pursuant to a control signal received at a receiver from a remote transmitter not wired to the receiver. In one embodiment, immediately upon manipulation of an actuator, such as a control slide actuator coupled to a potentiometer in the remote transmitter, a control signal is sent to the receiver, the information contained in the signal depending upon the setting of the control slide actuator. The manipulation of the actuator can be detected by using switches as described hereinafter; or in response to touching a control plate, or by using a proximity detector operated by breaking or reflecting a beam or otherwise. The receiver uses this signal to immediately adjust the power supplied to the load by the power controller, for example by causing the gate signals to a power carrying device, such as a triac, connected between a power source and the load to be adjusted. Adjustment of the dimming actuator therefore causes an instantaneous, real-time change in the output to the load.

Alternatively, a slide-actuator-operated potentiometer is used to select the desired light level and then a switch means is operated to cause the control signal to be sent from transmitter to receiver. This allows the desired light level to be preselected from an essentially continuous range of values. The switch means can be a momentary close switch or can be operated in response to touching a control plate, breaking or reflecting a beam, or some other overt act. The momentary close switch can be associated with or mounted independently of the control slide actuator.

In the embodiments described above, the output light level is directly related to the setting of the potentiometer slide actuator and there is thus visual feedback at the transmitter of the selected light level.

An enhancement to the invention can be provided by producing a gradual change between the present light level and the desired light level after selection of the desired light level at the transmitter; i.e. a fade. Prior art raise/lower systems inherently have a gradual change between the present and desired light level, which can not be too fast lest adjusting the system to produce a desired output be too difficult or too slow. Fade time in the present system can be varied by the user within a wide range of values.

A potentiometer with control slide actuator may also be provided in a control station for alternatively varying the power supplied to the load by the power controller. In such event, the system may be designed so that control is either transferred between the control station slide actuator and the transmitter slide actuator only by an overt act of the user, such as operating a momentary-close switching means associated with the slide actuator in the transmitter, or by the act of manipulating the slide actuator in the transmitter and without any additional overt act by the user.

Similarly control can be transferred between the transmitter slide actuator and the control station slide actuator by overtly operating a switch on the control station or by the mere act of manipulating the slide actuator on the control station.

The receiver can be mounted on a wall or ceiling, or it may be part of a wall, ceiling, table or floor lamp. Alternatively, the receiver can be combined with the power controller and/or attached to a line cord for plug-in connection and used to control an electrical outlet into which a lamp can be plugged.

In another embodiment of the present invention, the receiver, the control station, and the power controller are combined into a remotely controllable wallbox dimmer. The system includes a transmitter and a wall control/receiver having an actuator, positionable through a continuous range, and a power controller for controlling the power supplied to the load pursuant to manipulation of either the actuator on the wall control/receiver or an actuator on the transmitter. In one embodiment, immediately upon manipulation of an actuator on the transmitter, such as a control slide actuator coupled to a potentiometer, a control signal is sent to the wall control/receiver. The information contained in the signal depends upon the setting of the slide actuator. The wall control/receiver uses this signal to immediately adjust the power supplied to the load, for example by causing a change in the gate signals to a power carrying device, such as a triac, connected between a power source and the load. Additionally, the actuator on the wall control/receiver can also adjust the power supplied to the load immediately upon manipulation. The manipulation of either actuator can be detected by using switches, as described hereinafter or in response to touching a control plate, or by using a proximity detector operated by breaking or reflecting a beam, or otherwise. Therefore, adjustment of either the actuator on the wall control/receiver or the transmitter actuator causes an instantaneous, real-time change in the output of the load. Alternatively, the transmitter actuator comprises a push-button actuator, or a capacitive touch switch, or a pressureoperated membrane switch.

Alternatively, the wall control/receiver incorporates a push-button switch which alternately turns power to a load "on" to a level determined by the actuator or "off". Preferably, the push-button switch is a momentary switch; however, it could be an alternate action push-button switch, or a capacitive touch switch, or a pressure-operated membrane switch, among others. The transmitter preferably also incorporates a push-button switch which alternately turns power to a load "on" to a level determined by the actuator on the wall control/receiver or "off". Thus, power to a load is turned on or off in accordance with actuation of a push-button switch on either the wall control/receiver or the transmitter, and the level of power delivered to the load is adjusted by manipulation of the actuator on the wall control/receiver.

Alternatively, the wall control/receiver may independently control power to a plurality of loads. In such an embodiment, the wall control/receiver generally comprises multiple actuators, such as slide actuator-operated-potentiometers. The transmitter may generally include an actuator, positionable through a continuous range, such as a slide-actuator-operated potentiometer, for simultaneously adjusting power delivered to all the loads. Alternatively, the transmitter may generally comprise a plurality of push-button actuators for selecting, from among a plurality of preset power settings, the power delivered to each load.

Alternatively, the actuator on the wall control/receiver may be an adjustable slide actuator which can be manipulated to vary the power delivered to a load, wherein the adjustable slide actuator also moves in response to a radiant control signal from the transmitter, which also determines power delivered to the load.

Alternatively, the wall control/receiver incorporates a receiving lens mounted to and movable with a movable actuator, which may be a slide actuator, rotary actuator, push-button etc. A detector mounted behind the lens receives a radiant control signal from the transmitter and preferably moves coextensively with the movable actuator. Preferably, the detector is electrically connected to the power controller via a flexible conductor. Preferably, the movable actuator is removable from the wall control/receiver in order to facilitate installation and to allow for cleaning or replacement.

Alternatively, the wall control/receiver may incorporate a receiving lens mounted in an aperture, and a detector generally behind the receiving lens, wherein the receiving lens extends from the aperture towards the detector such that there is a minimum of open space (air gap) between the receiving lens and the detector, and the receiving lens substantially occupies the space between the detector and the aperture. Optionally, in order to minimize reflective signal losses, an optically clear adhesive can bond the detector to the lens, or the receiving lens surface facing the detector could be curved either cylindrically or spherically and generally has a center of curvature at the center of the detector.

The actuator on the wall control/receiver may, among others, be a slide actuator controlled potentiometer, a rotary potentiometer, or a pressure-operated position sensor. One embodiment of a pressure-operated position sensor was disclosed as a pressure-operated voltage divider in U.S. Pat. No. 3,895,288, issued to Lampen et al., July 15, 1975, incorporated herein by reference. A pressure-operated position sensor can also be a membrane potentiometer, as is manufactured by Spectra Symbol, Salt Lake City, Utah, under the trademark "SoftPot". Optionally, the actuator is removable from the wall control/receiver, or the actuator may further incorporate an optically transmissive lens for receiving a radiant control signal, or the actuator may be in itself optically transmissive.

The transmitter can be hand held or wall-mounted. In either case it can be battery powered or powered from an A.C. line.

The transmitter may include an actuator, positionable through a continuous range, wherein the power applied to a load corresponds with the setting of the actuator. Alternatively, the transmitter may have a push-button switch, capacitive touch switch, or a pressure-operated membrane switch for alternately turning power to a load on and off. Alternatively, the transmitter may have two push-buttons for either increasing or decreasing the power delivered to a load.

Preferably, the wireless transmitter transmits a radiant control signal immediately upon manipulation of an actuator on the transmitter and continues transmission for a period of time after the actuator is released, in order to allow the completion of an encoded signal.

The radiant control signal provided by the transmitter may be infrared, radio waves, ultra-sound etc. Preferably, the radiant control signal is digitally encoded, however, it can also be pulse-width modulated, amplitude modulated, or frequency modulated, among others.

The present invention, therefore, permits adjustment of the power supplied to a load, typically an electrical lamp, from any position where the transmitter is in wireless communication with a receiver. Because the transmitter is not wired to the receiver, the system may be readily installed in existing installations without extensive rewiring.

For a fuller understanding of the nature and objects of the invention, reference should be made to the following detailed description taken in connection with the accompanying drawings wherein.

Figure 1:
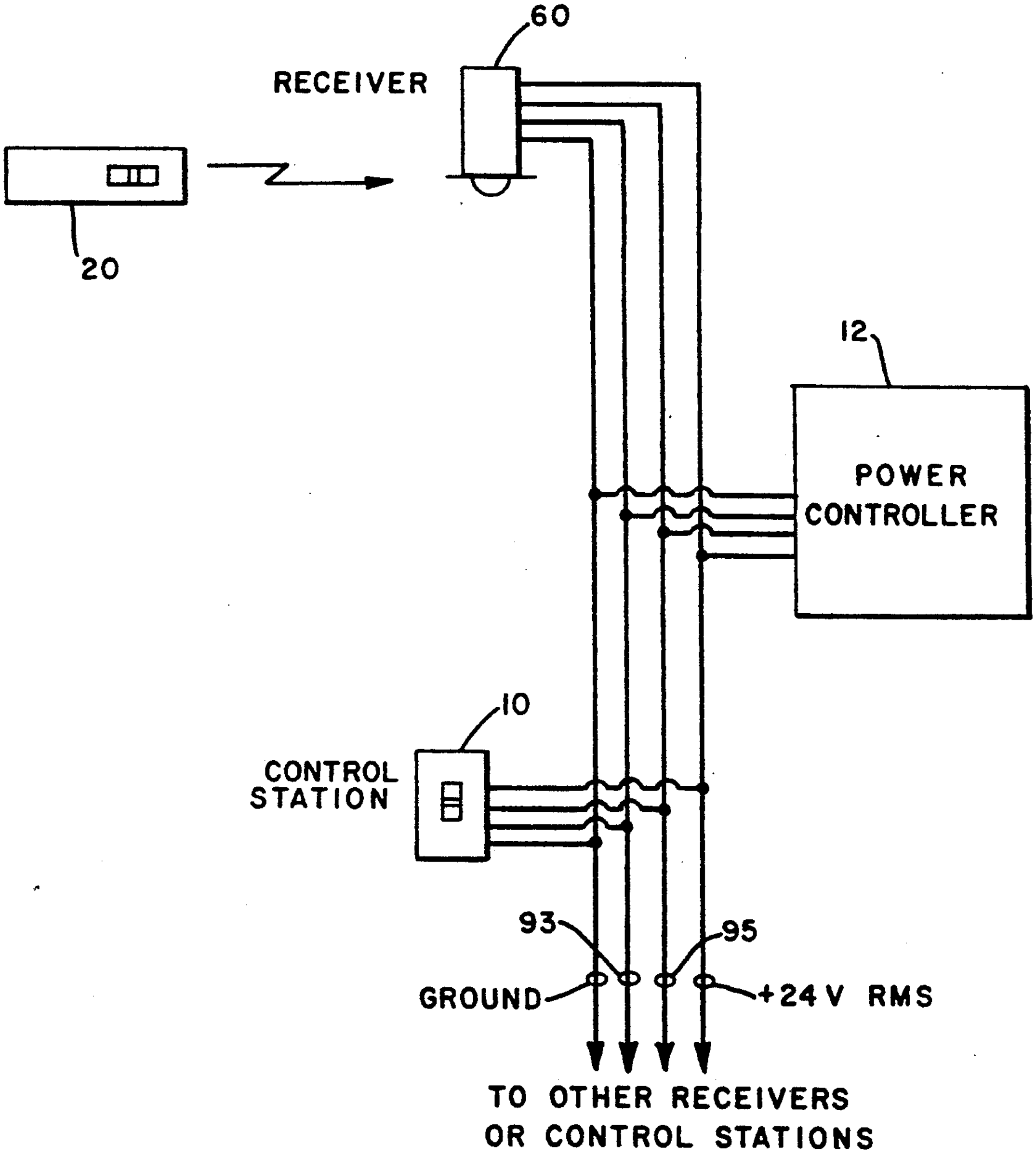
FIG. 1 is a block diagram showing an overview of a control system of the present invention.

In the drawings, wherein like reference numerals denote like parts, one embodiment of the remote wireless load control system of the present invention is described in FIG. 1. The latter includes transmitter 20, typically an infrared transmitter, and a receiver 60 therefore. The embodiment of FIG. 1 also includes control station 10 and power controller 12. Control station 10, receiver 60 and power controller 12 are linked together typically by a four-wire bus, the four wire bus consisting, for example, of a +24 Vrms line, a ground line, analog signal line 93 and take command line 95.

Figure 2A:
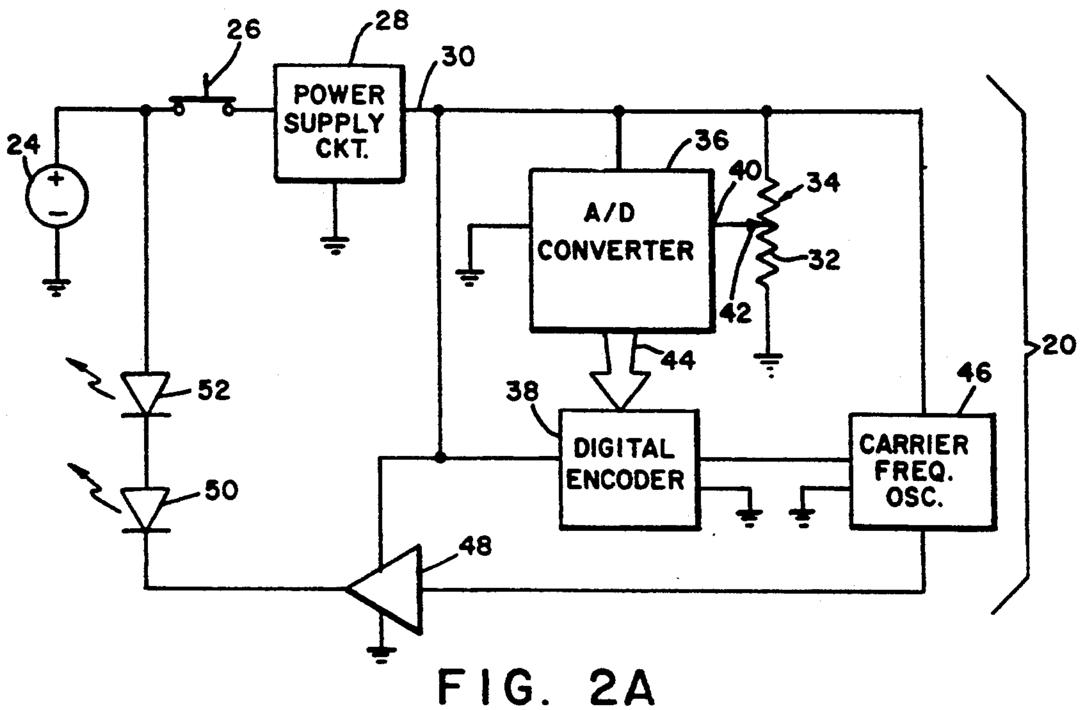
FIG. 2A is a block diagram showing one form of the transmitter of the present invention.

As described in FIG. 2A, transmitter 20 includes DC power source 24, typically a nine volt battery, connected between transmitter ground and one side of switch 26. The latter is preferably a normally open, single-pole, single-throw (SPST) momentary push-button switch that, when closed, serves to connect power source 24 to power supply circuit 28. Power supply circuit 28 is included to provide a stable, regulated voltage source and can be readily implemented in the form of a LM 2931Z integrated circuit manufactured by National Semiconductor Corporation.

Power output line 30 from power supply circuit 28 is connected to one end of resistive impedance 32 of slide-actuator-operated potentiometer 34, the other end of impedance 32 being coupled to ground. Power line 30 is also connected to provide the requisite power input to analog-to-digital converter 36, digital encoder 38, carrier frequency oscillator 46 and amplifier 48. Each of these latter devices is also connected to transmitter ground.

Analog-to-digital converter 36, typically a commercially available integrated circuit such as ADC0804 of National Semiconductor Corporation, is provided for converting an analog signal into a parallel digital output. To this end, analog input terminal 40 of converter 36 is connected to manually operable wiper 42 of potentiometer 34, wiper 42 being a conventional potentiometer wiper, configured to move typically linearly or along a curved path of operation in contact with resistive impedance 32. Adjustment of wiper 42 varies the resistive impedance of potentiometer 34 over a continuum of values. Parallel output digital databus 44 of converter 36 is connected as the data input to encoder 38, the latter typically being a commercially available integrated circuit such as MC145026 of Motorola Corporation that produces serially encoded data. The data output terminal of encoder 38 is connected to the data input terminal of carrier frequency oscillator circuit 46, the latter being exemplified in an ICM7556 integrated circuit manufactured by Intersil, Inc., Cupertino, Calif.

The output of oscillator circuit 46 is connected to the cathode of the first of a pair of series-connected infrared light-emitting diodes 50 and 52 through amplifier 48. The anode of diode 52 is connected to the positive terminal of power source 24. By mounting switch 26 on the actuator of potentiometer wiper 42, the transmitter can be operated in two different modes, track and preset, as detailed hereinafter.

Figure 2B:
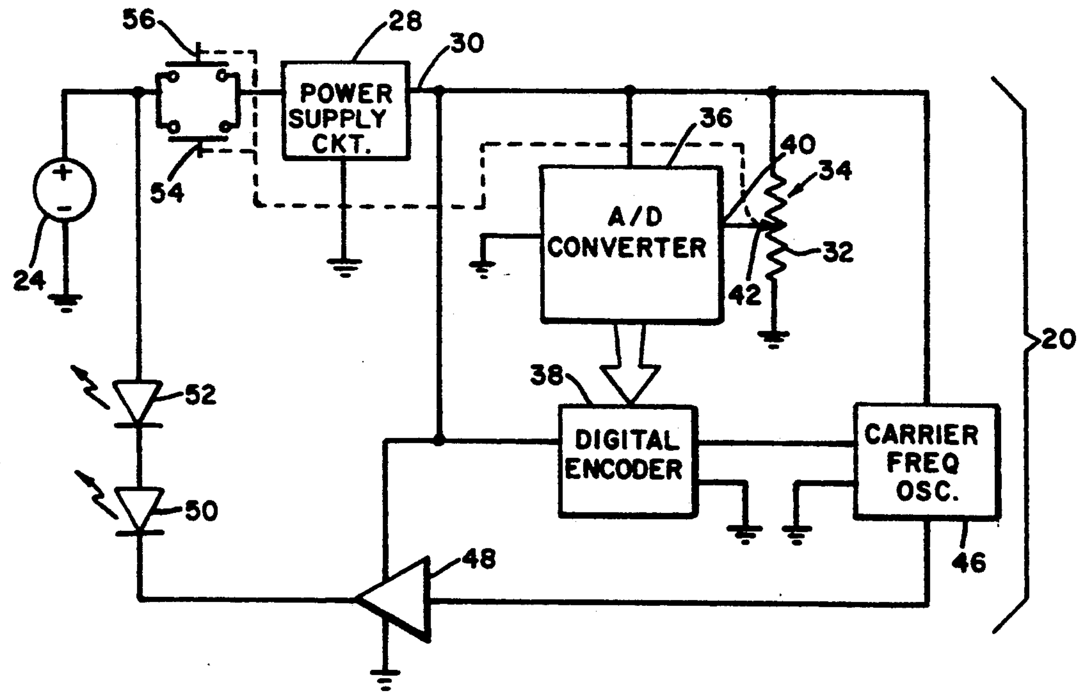
FIG. 2B is a block diagram showing an alternative form of a transmitter of the present invention.

In an alternative form of the transmitter of the present invention, as shown in FIG. 2B, switch 26 is omitted and power supply 24 is connected to the input of power supply circuit 28 through a pair of parallel, normally open, single-pole, single-throw spring-loaded push-button momentary close switches 54 and 56. The latter are mechanically coupled, as indicated by the dotted line, to wiper 42 so that one of the switches is momentarily closed while the wiper is being moved in one direction, the other switch being momentarily closed while the wiper is moved in the opposite direction. Thus, motion of the wiper in either direction closes one or the other of the two switches, energizing power supply 28 and providing the requisite or desired analog signal to A/D converter 36. Details of a switching mechanism particularly useful as switches 54 and 56 are disclosed in said U.S. Pat. No. 4,689,547 incorporated herein by reference.

Figure 3:
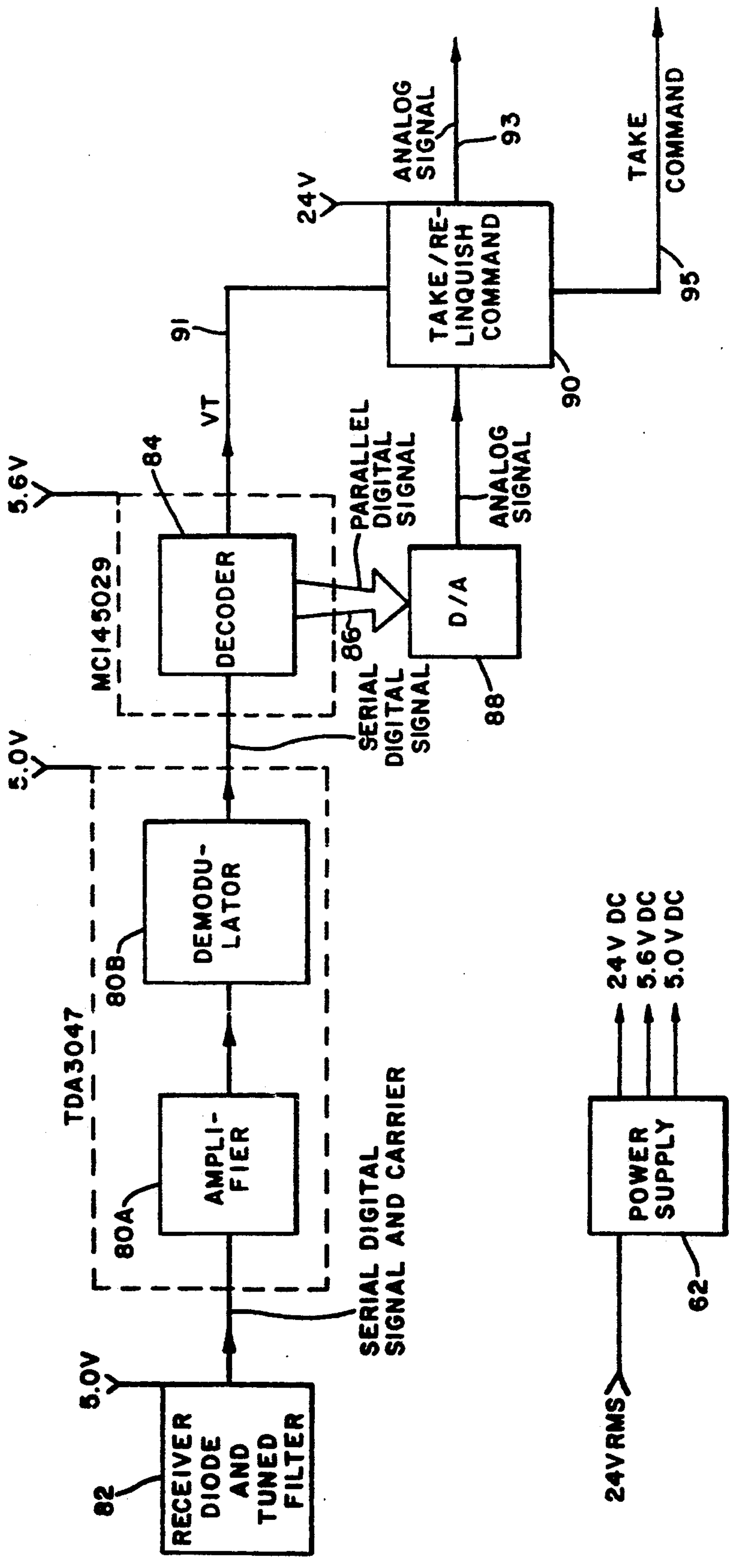
FIG. 3 is a block diagram of the receiver of the present invention.

Receiver 60, as shown in FIG. 3, is designed to be contained in a housing typically adapted for mounting in or on a wall (not illustrated) or in or on a ceiling (See FIG. 9A), but can be free standing if desired or adapted to be mounted as a part of the power controller circuit.

Receiver 60 includes power supply circuit 62 having its input coupled to a source of 24 Vrms. Outputs of 24 VDC, 5.6 V DC (regulated) and 5.0 V DC (unregulated) are provided. The 24 VDC output of power supply circuit 62 is coupled as a power input to take/relinquish command circuit 90. The 5.6 V DC output of power supply circuit 62 is coupled, as a power input, to decoder circuit 84. The 5.0 V DC output of power supply circuit 62 is coupled, as a power input, to amplifier/demodulator circuit 80A/80B and receiver diode and tuned filter circuit 82.

Infrared signals are received by a receiver diode or diodes and selected by using a tuned circuit in receiver diode and tuned filter circuit 82. The output of the receiver diode is a serial digital signal modulating a carrier. It is connected to the input of amplifier circuit 80A, the output of amplifier circuit 80A being connected to the input to demodulator circuit 80B. The output of demodulator circuit 80B is a serial digital signal that is connected to the signal input terminal of decoder circuit 84. Amplifier circuit 80A and demodulator circuit 80B may be implemented by using a TDA 3047 integrated circuit, as manufactured by Signetics.

The receiver diode is preferably mounted on or in the wall or ceiling-mounted housing in such a manner that it can receive signals from the widest possible number of directions.

Decoder circuit 84 is provided for converting a serial digital signal at its signal input terminal to a parallel digital signal on signal output bus 86 and also to signal the Take/Relinquish command circuitry that a valid signal transmission has occurred. A suitable circuit is commercially available as an MC 145029 chip manufactured by Motorola. Output bus 86 is connected to the signal input terminals of digital-to-analog converter circuit 88. Valid transmission output line 91 is connected to a control input of take/relinquish command circuit 90. The signal output terminal of digital-to-analog converter circuit 88 is connected to a switch means in take/relinquish command circuit 90. When the valid transmission output signal on line 91 goes high, the switch means closes and the analog output signal appears on output line 93. Take command line 95 is connected to a second control output of take/relinquish command circuit 90. When the signal on this line goes low, the switch means in take/relinquish command circuit 90 opens and the analog output signal is removed from output line 93.

In operation of the transmitter of FIG. 2A, when switch 26 is closed, the transmitter circuit is powered by source 24, at least during the time that switch 26 remains depressed. During that time, the analog signal provided by the position of wiper 42 in potentiometer 34 is sampled by A/D converter 40 and converted into digital signals in the form of parallel bits available on bus 44. Encoder 38 serves to encode the parallel bits of the digital signal into a single, serial-encoded data signal, thereby conferring relative noise immunity for decoding at the receiver side. The serial-encoded data signal is fed into oscillator 46 to provide amplitude modulation of the carrier frequency generated by the oscillator. Such modulation is intended to provide a high signal-to-noise ratio for infrared detection on the receiver side as will be described hereinafter. The duty cycle of the carrier frequency oscillations is approximately 20% to reduce power consumption. The amplitude modulated signal from oscillator 46 is then amplified in amplifier 48 to power infrared light-emitting diodes 50 and 52. It should be apparent to those skilled in the art that the integrated circuit chips and the modulation scheme selected insure very low power consumption, and that other integrated circuits and modulation schemes may also be utilized.

The circuit of FIG. 2A can be used in two different modes. In a first mode, referred to as tracking mode, one simply holds switch 26 down and adjusts the setting of wiper 42 on potentiometer 34. The lighting level consequently provided, as will be apparent hereinafter, will vary proportionately as the potentiometer is adjusted giving control over the power fed to the load substantially instantaneously in accordance with the position of the slide actuator relative to resistive impedance 32. In an alternative mode, referred to as preset mode, one can first adjust the potentiometer and then momentarily close switch 26. Closure of switch 26 then effectively instantly adjusts the power flow to the load at a level indicated by the position at which the potentiometer was set.

An infrared signal from transmitter 20, when received by infrared receiver diode 82, is converted to an electrical signal by the diode and applied to the input of pre-amplifier circuit 80. The latter selects the signal at the desired carrier frequency, amplitude demodulates to strip the carrier frequency, and amplifies the demodulated signal to obtain the serial-encoded signal sent by transmitter 20. The serial-encoded signal is then applied to the input of decoder 84. To ensure that the data to be decoded are valid, decoder circuit 84 preferably includes, in known manner, timing elements preset to match the timing of the serial-encoded data transmitted from diodes 50 and 52. When two consecutive valid data words are received from pre-amplifier 80, decoder circuit 84 provides a decode enable signal and applies it to line 91. Additionally, the decoder output which is a parallel bit digital signal, is latched internally and provided to bus 86. That parallel signal is then converted in D/A converter circuit 88 into an analog signal applied to one of the signal inputs of switch means 90. Because the decoder output is latched, the D/A conversion need not be synchronous.

Application of an enable signal on line 91 resets the state of the switches in switch means 90 so that the output from D/A converter circuit 88 is connected to analog signal line 93 of switch means 90.

The enable signal on line 91 can also be used to drive a signal received indicator light, which is especially useful when the load under control is remote from the receiver.

The operation of the transmitter of FIG. 2B is similar to the operation of the transmitter of FIG. 2A in its 'track' mode. The difference is that either switch 54 or switch 56 is closed automatically as the wiper 42 is moved and hence the operator of the system merely has to move the wiper 42 in the desired direction to send the appropriate signal; there is no necessity to operate overtly another switch.

Figure 4:
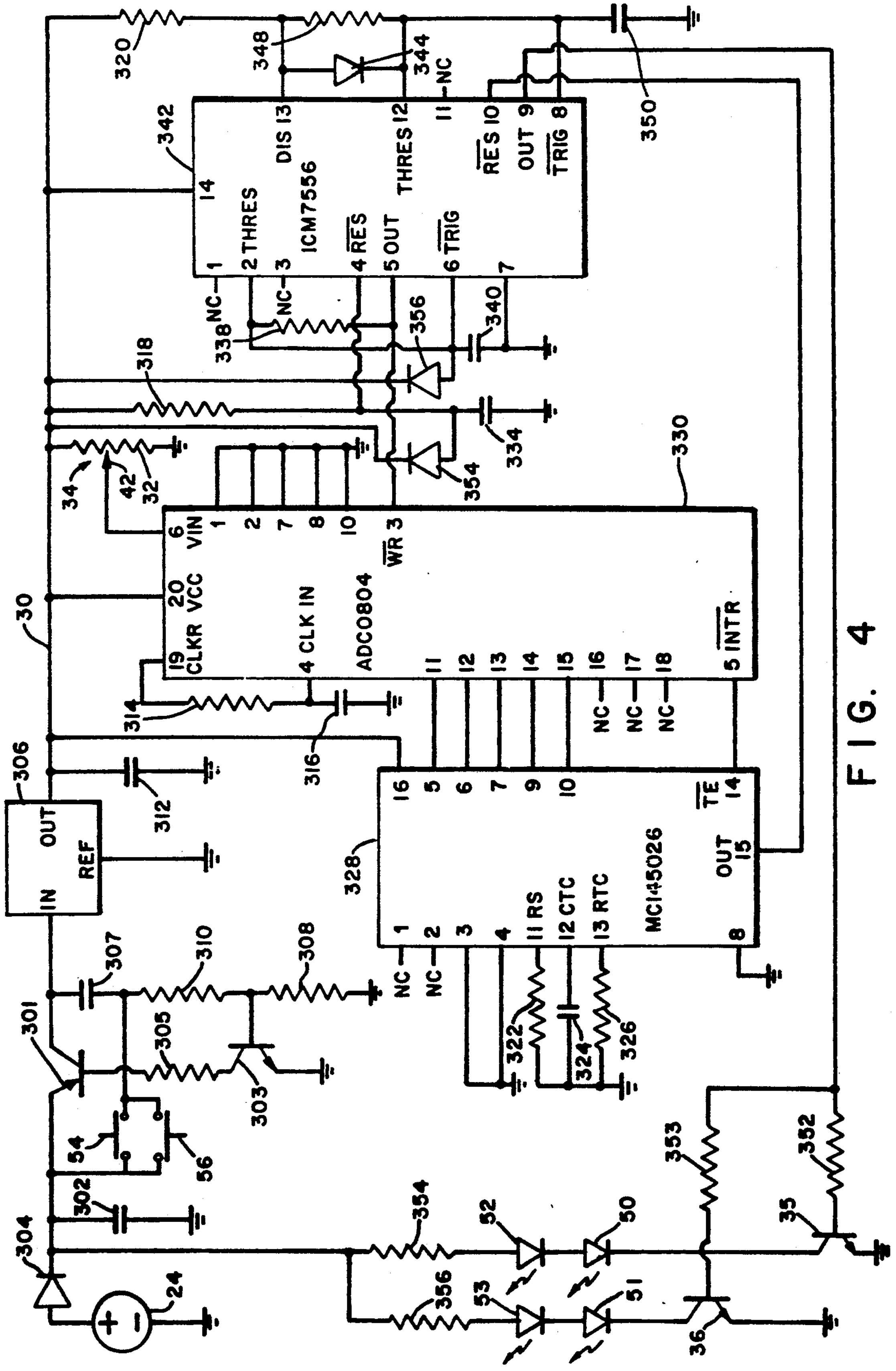
FIG. 4 is a circuit schematic of the transmitter embodiment of FIG. 2B of the present invention.

The embodiment of transmitter 20 illustrated schematically in FIG. 4 includes D.C. power source 24, connected between system ground and the anode of protection diode 304. The cathode of diode 304 is connected to the emitter of transistor 301. Capacitor 302 is connected in parallel with power source 24 and diode 304. The collector of transistor 301 is connected to the input terminal of voltage regulator 306. The base of transistor 301 is connected through resistor 305 to the collector of transistor 303, and the emitter of the latter is connected to ground. The base of transistor 303 is connected to respective terminals of resistor 308 and resistor 310. The other terminal of resistor 308 is grounded and the other terminal of resistor 310 is connected to one terminal of capacitor 307 and of switches 54 and 56. The other terminals of switches 54 and 56 are connected to the emitter of transistor 301. The other terminal of capacitor 307 is connected to the collector of transistor 301. The reference terminal of voltage regulator 306 is connected to ground. The output terminal of voltage regulator 306 is connected to power output line 30. Capacitor 312 is connected between power output line 30 and ground.

Power output line 30 is connected to one end of resistive impedance 32 of slide-actuator-operated potentiometer 34, the other end of resistive impedance 32 being connected to ground. Power output line 30 is also connected to pin 16 of digital encoder circuit 328, to pin 20 of analog-to-digital converter circuit 330 and to pin 14 of oscillator circuit 342.

Manually operable wiper 42 of potentiometer 34 is connected to the voltage input terminal at pin 6 of analog-to-digital converter circuit 330. Resistor 314 is connected between CLK R input at pin 19 and CLK IN input at pin 4 of converter circuit 330. Timing capacitor 316 is connected between CLK IN input pin 4 of converter circuit 330 and ground. CS at pin 1, RD at pin 2, VIN(−) at pin 7, A GND at pin 8 and D GND at pin 10 of convertor circuit 330 are all connected to ground. The data output connections at pins 11, 12, 13, 14 and 15 of converter 330 are connected to data input connections at pins 5, 6, 7, 9 and 10 of encoder circuit 328 respectively. The interrupt request INTR output at pin 5 of converter 330 is connected to transmit-enable input TR at pin 14 of encoder 328. The write request WR input at pin 3 of converter 330 is connected to the output at pin 5 of oscillator 342.

Timing circuit capacitor 324 is connected between CTC connection at pin 12 of encoder 328 and the common junction of resistor 322, timing resistor 326 and ground. The other end of resistor 322 is connected to RS connection at pin 11 of encoder 328 and the other end of timing resistor 326 is connected to RTC connection pin 13 of encoder 328. Pins 3,4 and 8 of encoder 328 are connected to ground. The output at pin 15 of encoder 328 is connected to RES at pin 10 of carrier frequency oscillator 342.

Resistor 320 is connected between power output line 30 and the discharge connection pin 13 of oscillator 342. The anode of diode 344 is connected to pin 13 of oscillator 342. The cathode of diode 344 and one end of resistor 348 are connected to the threshold (THRES) input at pin 12 of oscillator 342. The other end of resistor 348 is connected to pin 13 of oscillator 342. Threshold input pin 12 is further connected to trigger input pin 8 of oscillator 342, and one end of timing capacitor 350. The other end of timing capacitor 350 being connected to ground. The output at pin 9 of oscillator 342 is connected to respective one ends of resistors 352 and 353.

A sampling frequency oscillator forms part of oscillator 342. Timing capacitor 340 is connected between trigger input pin 6 of oscillator 342 and ground. Trigger input TRIG at pin 6 is further connected to the threshold input THRES at pin 2 of oscillator 342. Timing resistor 338 is connected between pin 2 and output pin 5 of oscillator 342. Pin 6 of oscillator 342 is connected to the anode of protection diode 356, the cathode of the latter being connected to power output line 30. Power on reset capacitor 334 is connected between ground and reset input RES at pin 4 of oscillator 342. Power on timing resistor 318 is connected between pin 4 of oscillator 342 and power output line 30. Pin 4 of oscillator 342 is connected to the anode of protection diode 354, the cathode of the latter being connected to power output line 30.

The other side of resistor 352 is connected to the base of transistor 35. The emitter of transistor 35 is connected to ground, the collector of transistor 35 being connected to the cathode of infrared light emitting diode 50. The anode of infrared light emitting diode 50 is connected to the cathode of infrared light emitting diode 52, the anode of the latter being connected to the cathode of diode 304 through resistor 354.

Similarly, the other side of resistor 353 is connected to the base of transistor 36. The emitter of transistor 36 is connected to ground, the collector of transistor 36 being connected to the cathode of infrared light emitting diode 51. The anode of infrared light emitting diode 51 is connected to the cathode of infrared light emitting diode 53, the anode of the latter being connected to the cathode of diode 304 through resistor 356.

The operation of the transmitter of FIG. 4 is as follows. On first inserting power source 24 into the transmitter and making connection to it, power supply capacitor 302 is charged up through protection diode 304. Power supply capacitor 302 serves to provide peak pulse currents to infrared light emitting diodes 50, 51, 52 and 53. Protection diode 304 prevents discharge of power source 24 and damage to transmitter circuitry in the event the power source 24 is miswired.

Moving wiper 42 of potentiometer 34 causes either switch 54 or switch 56 to close. This in turn causes transistor 303 to turn on, followed by transistor 301 connecting power source 24 to voltage regulator 306 through protection diode 304 and transistor 301. In the preferred embodiment, the output voltage of regulator 306 is approximately 5 V. Capacitor 312 filters the output voltage on power output line 30, which is used to power the other circuit components.

Transistors 301 and 303 together with capacitor 307 and resistors 305, 308 and 310 form a "nagger" circuit that continues to provide voltage to regulator 306 for a short period of time after switches 54 or 56 are opened, hence enabling transmission to be completed with a stable signal from wiper 42. When switch 54 or switch 56 is opened, capacitor 307 keeps transistor 303 turned on until it is charged up through resistors 310 and 308, at which time transistors 303 and 301 turn off and capacitor 307 again discharges.

Wiper 42 of potentiometer 34 taps off an analog voltage from resistive element 32. This analog voltage is applied to the input terminal of analog-to-digital converter 330. Resistor 314 and capacitor 316 are external components of an internal clock circuit within analog-to-digital converter 330. Once the conversion process is completed, the digital output is latched onto pins 11, 12, 13, 14 and 15 of converter 330 and the INTR output on pin 5 is driven low. This transition is applied to the transmit-enable input pin 14 of encoder circuit 328 causing the encoder circuit to begin the encoding process using the data available at its input pins 5, 6, 7, 9 and 10. Resistors 322 and 326 and capacitor 324 are external components of an internal clock circuit within encoder circuit 328. The serially encoded output of encoder 328 appears at pin 15 which is connected to the RES input at pin 10 of oscillator 342.

Oscillator 342 is actually two oscillators. The first is a carrier frequency oscillator with connections at pins 8, 9, 10, 12 and 13. Capacitor 350, resistors 320 and 348, and diode 344 are timing components of the carrier frequency oscillator which serve to generate a high frequency (in the preferred embodiment 108 kHz) carrier but with a duty cycle of only 20% to reduce power consumption. The low duty cycle is achieved by the arrangement of resistor 348 and diode 344. The carrier frequency oscillations are output at pin 9 and are modulated by the serially encoded data stream applied to pin 10.

The second oscillator is used to control the sampling rate of analog-to-digital converter 330 and has connections at pins 2, 4, 5 and 6. Resistor 338 and capacitor 340 determine the output frequency on pin 5 (which in the preferred embodiment is 20 Hz). Diode 356 resets capacitor 340 when line 30 goes low at power off.

When switch 54 or 56 is first closed, the input to RES at pin 4 is low and prevents the second oscillator from functioning. This input voltage will rise as capacitor 334 is charged through resistor 318. Once the voltage rises above a threshold value the oscillator begins oscillating. In this manner, the oscillator is not gated on until any noise associated with the power up transition has died away. Diode 354 resets capacitor 334 when line 30 goes low at power off. The output from pin 5 of oscillator 342 is applied to the WR input at pin 3 of analog-to-digital converter 330 and hence controls the sampling rate.

The modulated output of carrier frequency oscillator 342 appears at pin 9 and is applied through resistor 352 to transistor 35 and through resistor 353 to transistor 36.

The modulated output is amplified by transistors 35 and 36 and modulates the current flowing in infrared light-emitting diodes 50, 51, 52 and 53 to produce properly modulated infrared signals at the carrier frequency. Four light-emitting diodes are used to increase the range of the transmitter.

The presently preferred values of the resistors and capacitors of the embodiment of FIG. 4 are set forth in Table I below.

TABLE I

| RESISTOR | VALUE IN OHMS | TOLERANCE |
|---|---|---|
| 34 | 250K (VAR) | |
| 305 | 10K | 5% |
| 308 | 68K | 5% |
| 310 | 100K | 5% |
| 314 | 6.8K | 5% |
| 318 | 100K | 5% |
| 320 | 1.5K | 5% |
| 322 | 39K | 5% |
| 326 | 18.2K | 1% |
| 338 | 1.5M | 5% |
| 348 | 27.4K | 1% |
| 352 | 15K | 5% |
| 353 | 15K | 5% |
| 354 | 1 | 5% |
| 356 | 1 | 5% |
| **CAPACITOR** | **VALUE** | **TOLERANCE** |
| 302 | 1500 uF | 20% |
| 307 | 1 uF | 10% |
| 312 | 100 uF | 10% |
| 316 | 220 pF | 10% |
| 324 | 4.7 nF | 10% |
| 334 | 100 nF | 10% |
| 340 | 22 nF | 10% |
| 350 | 220 pF | 1% |

In the preferred embodiment, the following components are employed. Diode 304 is a type 1N5817, diodes 344, 354 and 356 are all type 1N914. Infrared light-emitting diode 50, 51, 52 and 53 are type SFH484. Transistors 35 and 36 are MPS A29. Transistor 301 is an 2N5806, transistor 303 is a 2N4123. Voltage regulator 306 is a National Semiconductor LM 2931Z. Analog-to-digital converter 330 is a National Semiconductor ADC0804. Encoder circuit 328 is a Motorola MC145026. Oscillator 342 is an Intersil ICM7556. Power source 24 is a 9 V battery, Switches 54 and 56 can be any momentary contact switches, rated for dry circuit use, that can be coupled to potentiometer 34.

Skilled practitioners will appreciate that the integrated circuit chips and other components having somewhat different operating parameters may also be satisfactorily employed in the transmitter. Also it will be appreciated that the movement of wiper 42 can be detected electronically or optically instead of mechanically as by using switches 54 and 56.

Figure 5:
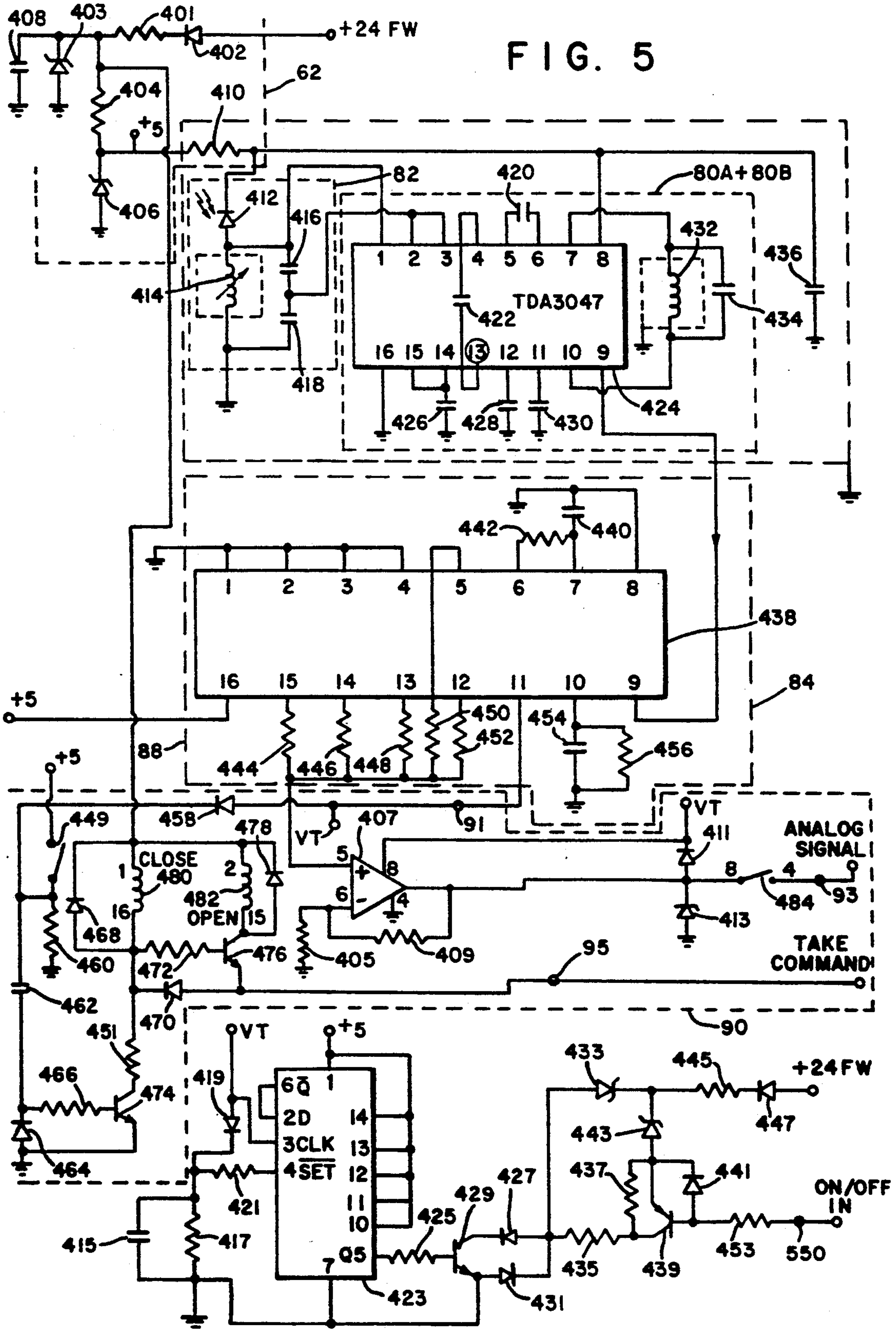
FIG. 5 is a circuit schematic of the receiver embodiment of FIG. 3 of the present invention.

The receiver embodiment illustrated schematically in FIG. 5 is the presently preferred embodiment of the receiver block-diagrammed in FIG. 3. Power supply 62 comprises diode 402, PTC resistor 401 resistors 404 and 410, zener diodes 403 and 406 and capacitor 408. The positive terminal of the 24 Vrms supply is connected to the anode of diode 402, the cathode being connected to one terminal of PTC resistor 401. The other terminal of PTC resistor 401 is connected to the cathode of zener diode 403, to one terminal of capacitor 408. The anode of zener diode 403 and the other terminal of capacitor 408 are connected to ground. The cathode of zener diode 403 is connected to one terminal of resistor 404. The other terminal of resistor 404 is connected in common to the cathode of zener diode 406, one terminal of resister 410 and the 5 V output of the power supply. The anode of zener diode 406 is connected to ground. The other terminal of resistor 410 is connected to the cathode of receiver diode 412. The 24 V DC output of the power supply is connected to the anode of diode 447. The V+ output of the power supply is also connected to the cathode of diodes 468 and 478, to one terminal of relay coils 480 and 482 in take/relinquish command circuit 90, to the cathode of diode 411 and to the positive supply terminal of IC407. The 5.0 V output of the power supply is connected to the VDD terminal of decoder integrated circuit 438, to the positive supply terminal of amplifier/demodulator integrated circuit 424, to the supply terminal of timer 423, to one terminal of relay contact 449 and through capacitor 436 to ground.

Receiver diode and tuned filter circuit 82 comprise receiver diode 412, variable inductor 414, and capacitors 416 and 418. The cathode of receiver diode 412 is connected to the 5.0 V output of power supply 62 through resistor 410. The anode of receiver diode 412 is connected to one terminal of variable inductor 414, to one terminal of capacitor 416 and to the input limiter terminal of amplifier/ demodulator circuit 424. The other terminal of variable inductor 414 is connected to ground. The other terminal of capacitor 416 is connected to one terminal of capacitor 418. The other terminal of capacitor 418 is connected to ground. The junction between capacitors 416 and 418 is connected to the controlled high frequency amplifier and Q-factor killer within amplifier/demodulator integrated circuit 424.

Amplifier/demodulator 80A/80B comprises amplifier/demodulator integrated circuit 424, capacitors 420, 422, 426, 428, 430 and 434 and inductor 432. Capacitors 420 and 422 are stabilization capacitors connected to the controlled high frequency amplifier within amplifier/demodulator integrated circuit 424. Capacitor 426 is a coupling capacitor connected to the controlled high frequency amplifier within amplifier/demodulator integrated circuit 424. Capacitor 428 is connected to the automatic gain control detector within amplifier/-demodulator integrated circuit 424 and controls the acquisition time of the automatic gain control detector. Capacitor 430 is connected to the pulse shaper circuit within amplifier/demodulator integrated circuit 424 and controls its time constant. Capacitor 434 and inductor 432 are connected in parallel and are connected to the reference amplifier circuit within amplifier/-demodulator circuit 424. The output of the amplifier/-demodulator integrated circuit is connected to the input to decoder integrated circuit 438.

Decoder circuit 84 comprises decoder integrated circuit 438, resistors 442 and 456, and capacitors 440 and 454. The VSS terminal of decoder integrated circuit 438 is connected to ground. As noted above, the VDD terminal of decoder integrated circuit 438 is connected to the 5 V output of power supply 62. Resistor 442 is connected to the pulse discriminator pins of decoder integrated circuit 438. Capacitor 440 is connected between one of the pulse discriminator pins and ground. Together, resistor 442 and capacitor 440 set a time constant that is used to determine whether a wide or a narrow pulse has been encoded. Resistor 456 is connected in parallel with capacitor 454, and the parallel combination is connected between the dead time discriminator pin of decoder integrated circuit 438 and ground. These components set a time constant that is used to determine both the end of an encoded word and the end of transmission. The decoded data appears at the data outputs of decoder integrated circuit 438. Pins 1, 3 and 4 of decoder integrated circuit 438 are connected to ground.

Digital-to-analog convertor circuit 88 comprises resistors 444, 446, 448, 450 and 452. Each data output of decoder integrated circuit 438 is connected to a terminal of one of these resistors. The other terminal of each resistor is connected to the positive input of integrated circuit 407 in take/relinquish command circuit 90. The resistor values are selected such the data word on the data output terminals of decoder integrated circuit 438 is converted to an analog voltage on the positive input terminal of integrated circuit 407.

Take/relinquish command circuit 90 comprises resistors 405, 409, 451, 460, 466 and 472, capacitor 462, diodes 411, 413, 458, 464, 468, 470 and 478, transistors 474 and 476, relay coils 480 and 482, relay contacts 449 and 484, and integrated circuit 407. The valid transmission output terminal of decoder integrated circuit 438 is connected to the anode of diode 458 via line 91. The cathode of diode 458 is connected to one terminal of resistor 460 to one terminal of contacts 449 and to one terminal of capacitor 462. The remaining terminal of resistor 460 is connected to ground. The remaining terminal of contacts 449 is connected to a +5 V power supply. The remaining terminal of capacitor 462 is connected to the cathode of diode 464 and one terminal of resistor 466. The anode of diode 464 is connected to ground. The other terminal of resistor 466 is connected to the base of transistor 474. The emitter of transistor 474 is connected to ground and the collector is connected to one terminal of resistor 451. The other terminal of resistor 451 is connected to the cathode of diode 470, one terminal of resistor 472, one terminal of relay coil 480 and the anode of diode 468.

The other terminal of resistor 472 is connected to the base of transistor 476. The anode of diode 470 is connected to the emitter of transistor 476 and to take command line 95. The collector of transistor 476 is connected to one terminal of relay coil 482 and to the anode of diode 478. The cathodes of diodes 468 and 478 and the other terminals of relay coils 480 and 482 are connected to the V+ output of power supply 62. The negative input of integrated circuit 407 is connected to one terminal of resistor 405 and 409. The other terminal of resistor 405 is connected to ground. The other terminal of resistor 409 is connected to the output of integrated circuit 407, the anode of diode 411, the cathode of diode 413 and one terminal of relay contact 484. The cathode of diode 411 is connected to V+. The anode of diode 413 is connected to ground. The free terminal of relay contact 484 is connected to analog signal line 93.

Receiver 60 further includes light-emitting diode 427 and driving circuits comprising timer circuit 423, transistors 429 and 439 and associated components. Light-emitting diode 427 indicates whether power to the load is on or off and whether the receiver is receiving a signal, as is described in more detail in copending application Ser. No. 131,776 filed Dec. 11, 1987.

Pins 1 (RESET), 10, 11, 12, 13 and 14 of timer circuit 423 are connected to the 5.0 V supply. Pin 7 is connected to ground. The Q output (pin 6) is connected to the D input (pin 2). The valid transmission output $V_T$, line 91, from decoder integrated circuit 438 is connected to the CLK input (pin 3) of timer circuit 423 and to the anode of diode 419. The cathode of diode 419 is connected to one terminal of capacitor 415, and to corresponding terminals of resistors 417 and 421. The other terminals of capacitor 415 and resistor 417 are connected to ground. The other terminal of resistor 421 is connected to the SET input (pin 4) of timer circuit 423. The Q output (pin 5) of timer circuit 423 is connected to one terminal of resistor 425.

The other terminal of resistor 425 is connected to the base of transistor 429. The emitter of transistor 429 is connected to ground. The collector of transistor 429 is connected to the cathode of light-emitting diode 427. The anode of light-emitting diode 427 is connected to the cathode of zener diode 431, to the anode of zener diode 433, and to one terminal of resistor 435. The anode of zener diode 431 is connected to ground. The other terminal of resistor 435 is connected to the collector of transistor 439 and one terminal of resistor 437. The other terminal of resistor 437 is connected in common to the emitter of transistor 439, the cathode of diode 441 and the anode of zener diode 443. The cathode of zener diode 443 is connected to the cathode of zener diode 433 and one terminal of PTC resistor 445. The other terminal of PTC resistor 445 is connected to the cathode of diode 447, the anode of diode 447 being connected to the +24 V full wave supply.

The anode of diode 441 is connected to the base of transistor 439 and one terminal of resistor 453. The other terminal of resistor 453 is connected to the relay on/off line 550 in power controller 12. When the relay is on, line 550 is held close to ground. When the relay is off, line 550 floats to +24 V.

Infrared receiver diode 412 receives infrared signals which are selected by the tuned circuit formed by variable inductor 414 and capacitors 416 and 418. The selected signal is then applied to the input of amplifier/demodulator integrated circuit 424. The amplified and demodulated output signal is applied to the input of decoder integrated circuit 438. The digital output produced is converted to an analog signal by resistors 444, 446, 448, 450 and 452, and applied to the positive input of integrated circuit 407 which acts as a buffer amplifier. The output of integrated circuit 407 is applied to one terminal of relay contact 484. Diodes 411 and 413 serve to clamp the output voltage from integrated circuit 407 to be no greater than V+ or less than ground.

When a valid output is available at the digital output terminals of decoder integrated circuit 438, then line 91 goes high. This causes the voltage on the cathode of diode 464 to go high and transistor 474 to turn on, and allows current to flow through relay coil 480, closing relay contacts 449 and 484 and applying the analog output signal to line 93. Capacitor 462 then charges through resistor 466. When line 91 goes low, capacitor 462 is kept charged at +5 V by contacts 449 which remain closed as do contacts 484 since they are contacts of a latching relay. Diode 464 protects the base-emitter junction of transistor 474.

If take-command line 95 goes low then transistor 476 is turned on and receives base current through relay coil 480 and resistor 472. Collector current flows through relay coil 482 and causes relay contacts 449 and 484 to open. This causes capacitor 462 to discharge through resistor 460, with the discharge current flowing through diode 464. Transistor 474 is turned off and the energy stored in relay coil 480 circulates through protection diode 468. Diode 458 protects the output terminal of decoder integrated circuit 438.

Take-command line 95, going high, causes transistor 476 to turn off and the energy stored in relay coil 482 circulates through protection diode 478. Diode 470 allows take command line 95 to be pulled low when transistor 474 turns on thus relinquishing command at all other connected stations.

The operation of the circuitry that drives light-emitting diode 427 is as follows. In the absence of a received signal, the Q output of timer circuit 423 is high and transistor 429 is on. If the load is also on, then the on/off input is low and transistor 439 is also on. Hence, a relatively large amount of current flows through light-emitting diode 427 and the latter glows brightly, indicating that the load is on.

$V_T$ (line 91) goes high each time a valid transmission (i.e. with a frequency of 20 Hz) is received by the receiver. Timer circuit 423 is set up as a divide-by-2 counter so that the Q output (pin 5) oscillates at a frequency of 10 Hz. This causes transistor 427 to turn on and off at that frequency so that light-emitting diode 427 blinks at the 10Hz frequency, indicating the reception of a signal from the transmitter.

When valid transmissions are no longer received, the Q output goes high, turning transistor 427 on once again. If the result of the transmission was to turn the load off, then the on/off input is high and transistor 439 is now off. The current flowing through light-emitting diode 427 also has to flow through resistor 437, and it is a much lesser value than previously. Hence light-emitting diode 427 glows more dimly, indicating that the load is off.

The various diodes and zener diodes are for the protection of transistors 429 and 439.

The presently preferred values of resistors and capacitors for the circuit of FIG. 5 are given in Table II below. All resistors are 0.5W power rating unless otherwise stated.

TABLE II

| RESISTOR | VALUE IN OHMS | CAPACITOR | VALUE |
|---|---|---|---|
| 404 | 3.3k | 408 | 100 uF |
| 405 | 10k | 415 | 1 uF |
| 409 | 30.1k | 416 | 150 pF |
| 410 | 22 | 418 | 680 pF |
| 417 | 1M | 420 | 3.3 nF |
| 421 | 1k | 422 | 22 nF |
| 425 | 15k | 426 | 1 nF |
| 435 | 810 | 428 | 47 nF |
| 437 | 43k | 430 | 330 pF |
| 442 | 33k | 434 | 1000 pF |
| 444 | 20k | 436 | 22 uF |
| 446 | 40k | 440 | 10 nF |
| 448 | 80k | 454 | 10 nF |
| 450 | 10k | 462 | 2.2 uF |
| 451 | 68 | | |
| 452 | 160k | | |
| 453 | 33k | | |
| 456 | 645k | | |
| 460 | 1M | | |
| 466 | 56k | | |
| 472 | 56k | | |

PTC resistors 401 and 445 are preferably 180 ohms. Light-emitting diode 427 is preferably a Martec 530-0.

Diodes 419, 458, 464, 468, 470 and 478 are preferably type 1N 914. Diodes 402, 411, 413, 441 and 447 are preferably type 1N 4004. Zener diode 403 is a type 1.5 KE 39A. Zener diode 406 preferably has a zener voltage of 5.0 V. Zener diodes 341 and 433 preferably have zener voltages of 33 V. Zener diode 443 preferably has a zener voltage of 10 V. Receiver diode 412 is preferably a Siemens type SFH205. Transistors 429, 474 and 476 are preferably type MPSA29. Transistor 439 is preferably a type MPS 1992. Amplifier/demodulator integrated circuit 424 is preferably a Signetics type TDA 3047. Decoder integrated circuit 438 is preferably a Motorola type MC 145029. Integrated circuit 407 is preferably a Motorola type MC 33172P. Timer circuit 423 is preferably a 74HC74. Variable inductor 414 preferably has a maximum value of 18 mH. Inductor 432 preferably has a maximum value of 4 mH. Relay coils 480 and 482 and relay contacts 449 and 484 together form a latching type relay, for example an Omron G5AK237POC24.

Figure 6:
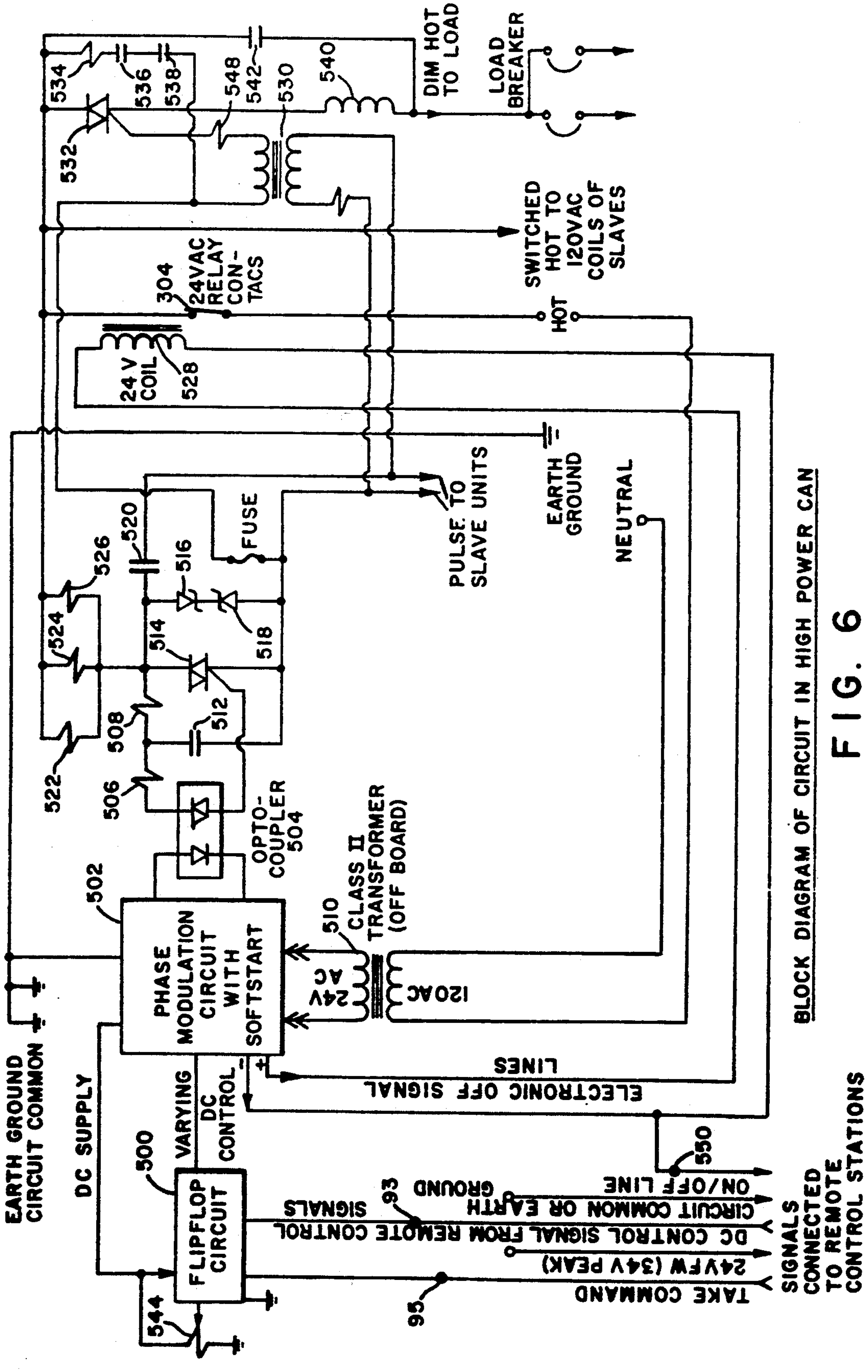
FIG. 6 is a block diagram showing the power controller of the present invention.

As shown in FIG. 6, the power controller of the present invention receives signals from the receiver or another control station and outputs a phase-controlled output voltage. To this end, flip-flop circuit 500 is connected to power-up preset potentiometer 544, analog signal line 93 and take-command line 95. Its output is connected to phase modulation circuit 502, and it receives power from a D.C. supply. On first powering up the power controller, flip-flop circuit 500 assumes a state where the voltage tapped off power-up preset potentiometer 544 is applied to phase modulation circuit 502. When take-command line 95 is pulled low, flip-flop circuit 500 toggles, and the voltage on analog signal line 93 is applied to phase modulation circuit 502.

Phase modulation circuit 502 has outputs to relay 528, on/off control line 550 and optocoupler 504. If the voltage at the input to phase modulation circuit 502 is above a predetermined value, then voltage is applied to the coil of relay 528 causing its contacts to close, applying the voltage to main triac 532. Varying the input voltage to phase modulation circuit 502 above the predetermined value, produces an output signal of varying phase delay from the zero crossings of the A.C. line, which signal is applied to optocoupler 504. Phase modulation circuit 502 is powered from transformer 510.

The output from optocoupler 504 is applied to signal triac 514, gating the latter on. Resistors 522, 524 and 526 limit the current through triac 514 in the on state. Resistor 508 and capacitor 512 form an RC snubber for triac 514. Resistor 506 limits current in optocoupler 504. Capacitor 520 charges to a voltage limited by zener diodes 516 and 518 when triac 514 is in the off state. When signal triac 514 is gated on, capacitor 520 discharges and causes a pulse of current to flow through pulse transformer 530.

The pulse of current generated on the secondary side of pulse transformer 530, flows through gate resistor 548 and gates on main triac 532. Resistor 534 and capacitors 536 and 538 form a snubber for main triac 532. Inductor 540 and capacitor 542 form a radio frequency interference filter.

Thus, the output voltage from the power controller is phase-controlled A.C. voltage whose value depends on the voltage on analog signal line 93. In the event this voltage is adjusted to be below a certain predetermined value, then power relay 528 will open to provide a positive air gap between the power source and the output. On restoration of power following a power failure, the output voltage will depend on the setting of power preset potentiometer 544.

Figure 7A:
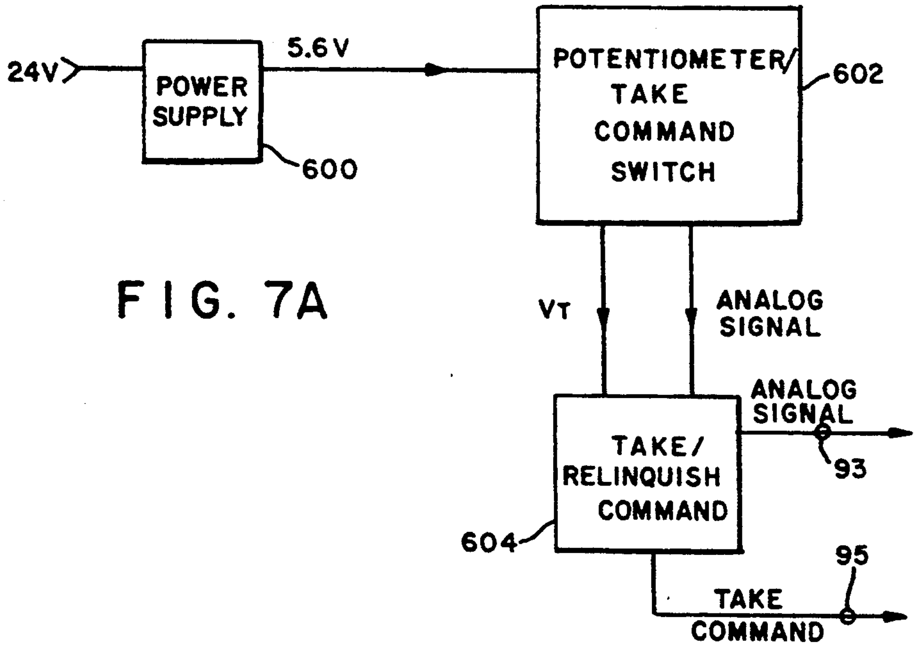
FIG. 7A is a block diagram of the control station of the present invention.

A suitable control station 10, for use with the power controller described in FIG. 6, is shown in block diagram form in FIG. 7A, and comprises power supply 600, potentiometer/take command switch circuit 602 and take/relinquish command circuit 604. Power supply 600 has as its input, a source of 24 Vrms full wave rectified direct current, and outputs a regulated 5.6 V to potentiometer/take command switch circuit 602. The outputs from potentiometer/take command switch circuit 602 are an analog signal voltage and a take-command signal. These are connected to take/relinquish command circuit 604. Take/relinquish command circuit 604 is connected to analog signal bus 93 and take command bus 95.

If a take-command signal is received by take/relinquish command circuit 604 from potentiometer/take command switch circuit 602, then the analog output signal from circuit 602 is connected to analog signal bus 93, and all other signal generators are disconnected from this bus. This state will persist until another control station or an infrared receiver takes command, which causes take-command bus 95 to go low and the analog output signal from circuit 602 to be disconnected from analog output bus 93.

Figure 7B:
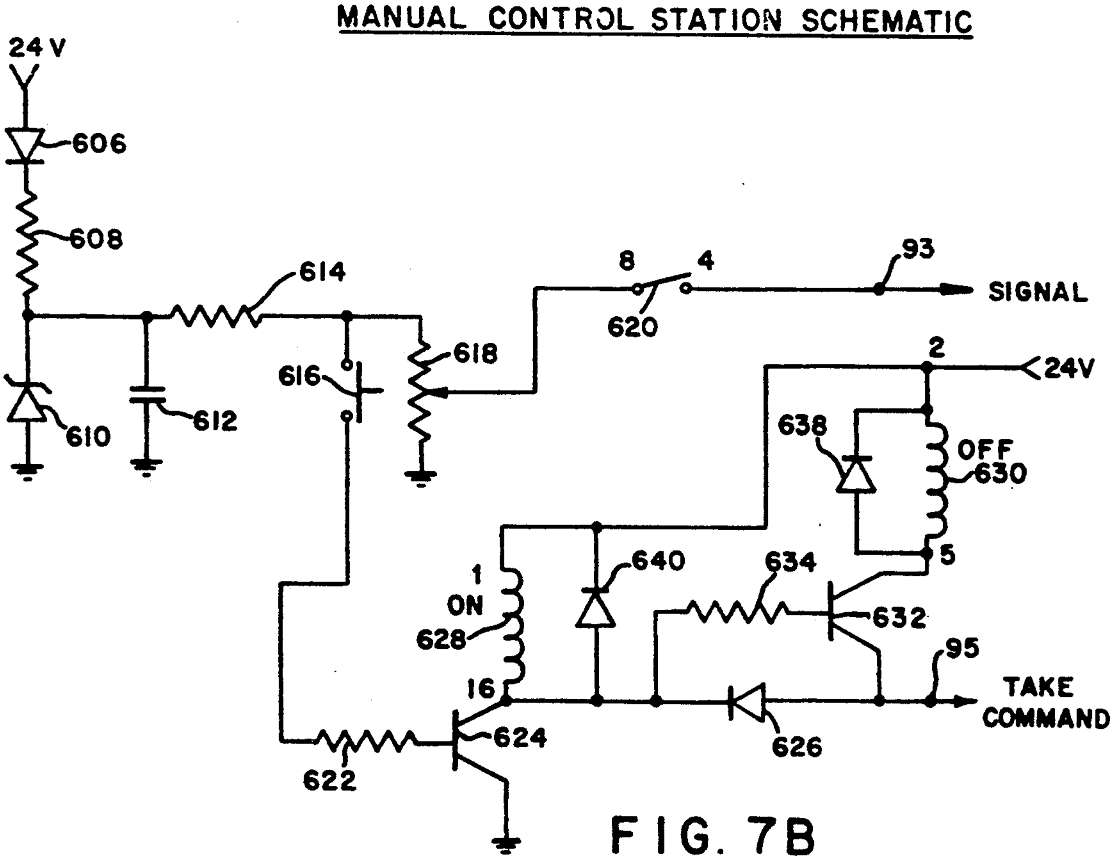
FIG. 7B is a circuit schematic of the control station of the present invention.

The control station embodiment illustrated schematically in FIG. 7B is the presently preferred embodiment of the control station block-diagrammed in FIG. 7A, wherein power supply circuit 600 comprises diode 606, resistors 608 and 614, zener diode 610, and capacitor 612. The positive terminal of the 24 Vrms source is connected to the anode of diode 606, the cathode of which is connected to one terminal of resistor 608, the other terminal of resistor 608 being connected in common to the cathode of zener diode 610, one terminal of capacitor 612 and one terminal of resistor 614. The anode of zener diode 610 and the other terminal of capacitor 612 are connected to ground. A regulated voltage of 5.6 V is produced at the cathode of zener diode 610 and this is connected to potentiometer/take-command switch circuit 602.

Circuit 602 comprises switch 616 and potentiometer 618, which can be a linear or rotary potentiometer. One terminal of potentiometer 618 is connected to the free terminal of resistor 614, the other terminal being connected to ground. The wiper is connected to switch contacts 620 in take/relinquish command circuit 604. One terminal of switch 616 is connected to the junction between resistor 614 and potentiometer 618. The other terminal of switch 616 is connected to one terminal of resistor 622 in take/relinquish command circuit 604. By varying the setting of potentiometer 618, a varying analog voltage can be applied to one terminal of switch contacts 620.

Switch 616 can be a separately actuable switch such as a push-button, microtravel switch or it can be integrated with the actuator for potentiometer 618 such that when potentiometer 618 is adjusted, then switch 616 is closed, as described in aforementioned copending U.S. patent application Ser. No. 857,739.

Take/Relinquish command circuit 604 comprises resistors 622 and 634, transistors 624 and 632, diodes 626, 638 and 640, latching relay coils 628 and 630, and relay switch contacts 620. The base of transistor 624 is connected to the other terminal of resistor 622, the emitter being connected to ground. The collector of transistor 624 is connected in common to relay coil 628, the anode of diode 640, one terminal of resistor 634 and the cathode of diode 626. The anode of diode 626 is connected to the emitter of transistor 632 and take-command line 95. The other terminal of resistor 634 is connected to the base of transistor 632. The collector of transistor 632 is connected to the anode of diode 638 and one terminal of relay coil 630. The cathodes of diodes 638 and 640 and the free terminals of relay coils 628 and 630 are connected to the positive terminal of the 24 Vrms source.

Closing take-command switch 616 causes base current to flow through resistor 622 turning transistor 624 on. Collector current flows through relay coil 628 closing switch contacts 620 and connecting the wiper of potentiometer 618 to analog signal bus 93. Also, take-command bus 95 is pulled low, disconnecting all other signal generators. When switch 616 is released, transistor 624 stops conducting, the energy stored in relay coil 628 circulates through protection diode 640, but switch contacts 620 remain closed. Take-command bus 95 can float high again.

When take command bus 95 is next pulled low due to an IR receiver or another control station taking command, base current flows through relay coil 628 and resistor 634 turning transistor 632 on. This allows collector current to flow in relay coil 630, opening switch contacts 620. When take-command bus 95 floats high again, transistor 632 turns off, the energy stored in relay coil 630 is circulated through protection diode 638 and switch contacts 628 remain open.

The presently preferred values of components in FIG. 7B are as follows. Resistors are all 0.5W power rating. Resistor 608 has a value of 3.6 kilohms, resistor 614 has a value of 1 kilohm, resistor 622 has a value of 3.3 megohms, and resistor 634 has a value of 31 kilohms. Capacitor 612 has a value of 47 uF. Diode 606 is preferably a type 1N 4004. Diodes 626, 638 and 640 are types 1N 914. Zener diode 610 has a zener voltage of 5.6 V. Transistors 624 and 632 are type MPS A28. Relay coils 628 and 630 and switch contacts 620 together form a latching type relay. Potentiometer 618 has a value of 10 kilohms.

Figure 8:
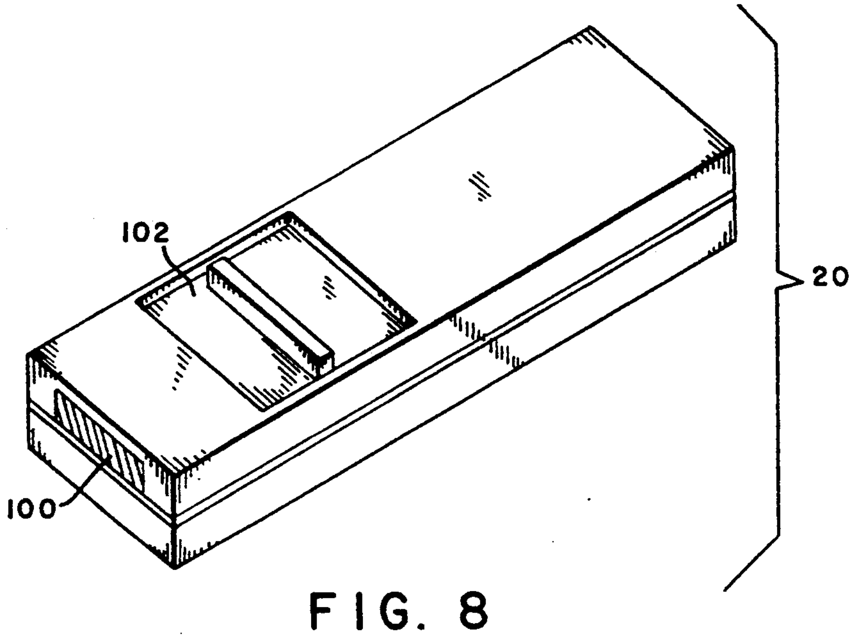
FIG. 8 is a perspective view of the mechanical aspects of the preferred embodiment of the transmitter of the present invention.

As shown in FIG. 8, transmitter 20 can be contained in a housing adapted to be comfortably held in the operator's hand. Infrared light-emitting diodes 50, 51, 52, and 53 are located behind plastic window 100 which is transparent to infrared light. Slide actuator 102 is connected to the operator shaft for wiper 42 of potentiometer 34. Switches 54 and 56 are coupled to slide actuator 102 as described in copending U.S. patent application Ser. No. 857,739 filed Apr. 29, 1986 incorporated herein by reference.

Figure 9A:
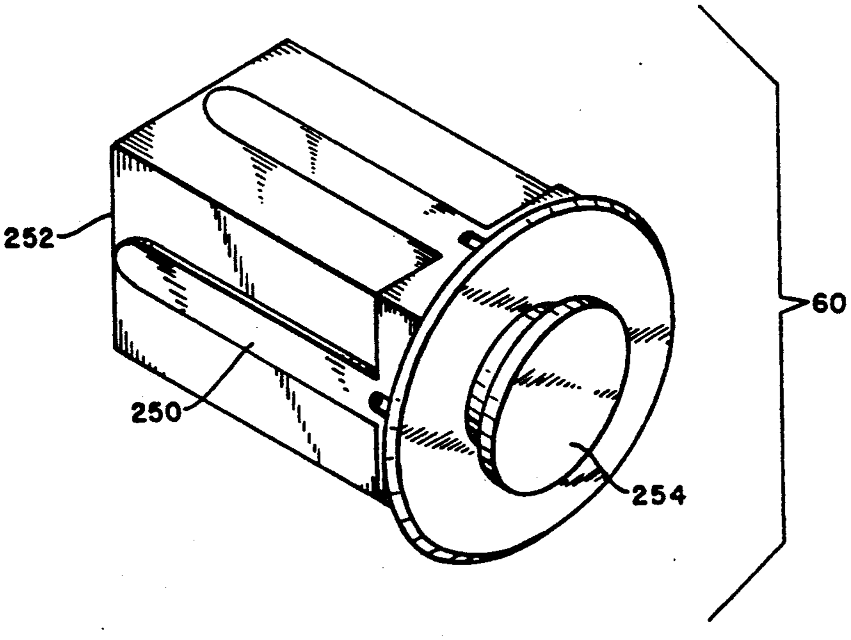
FIG. 9A is a perspective view of the mechanical aspects of the preferred embodiment of the receiver of the present invention.

As shown in FIG. 9A, receiver 60 can be contained in a housing adapted for mounting in plaster or lay-in tile ceilings. Infrared detector diode 82 is located behind a cylinder of material that has a high infrared transmittance. Housing 252 contains the receiver circuitry. Mounting clip 250 is used for fixing receiver 60 to the ceiling.

Figure 9B:
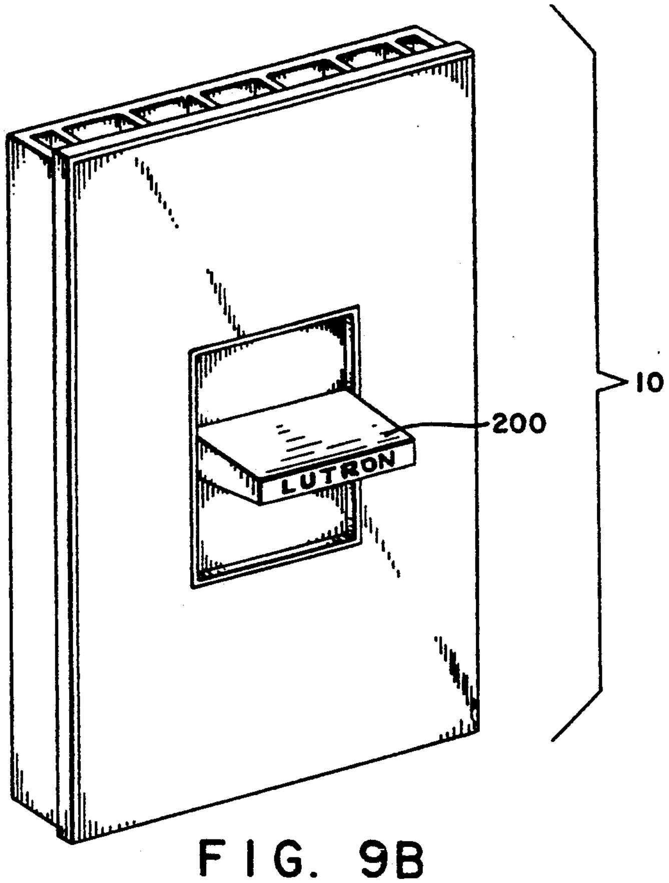
FIG. 9B is a perspective view of the mechanical aspects of the preferred embodiment of the control station of the present invention.

As shown in FIG. 9B, control station 10 has slide actuator 200 which is coupled to the actuator shaft of the wiper of potentiometer 618. Switch 616 can also be coupled to slide actuator 200 as described in previously noted copending U.S. patent application Ser. No. 857,739.

Figure 10:
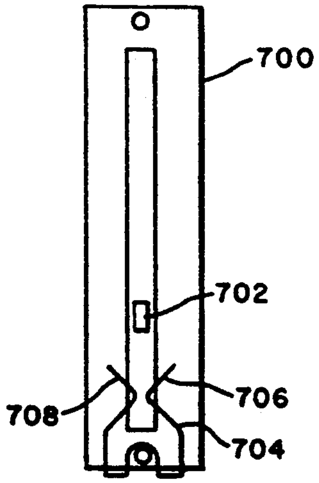
FIG. 10 is a plan view of a modified linear potentiometer suitable for use with the transmitter of the invention.

FIG. 10 illustrates a modified linear potentiometer suitable for use with the transmitter of the present invention. Since the transmitter transmits an off signal, which opens up an airgap switch in the controller when the slide actuator is moved to one end of its travel, it is preferable to give the operator of the transmitter the sensory impression that a switch in the transmitter has been opened. This can be done by attaching spring 704

Figure 14:
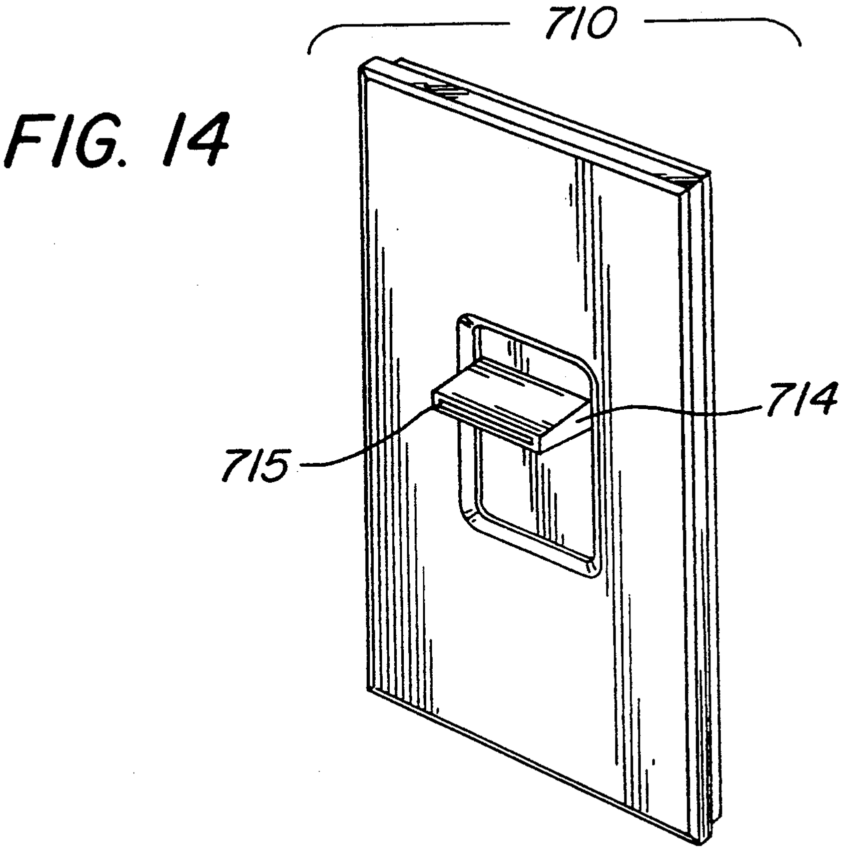
FIG. 14 is a perspective view of a prefered embodiment of the wall control/receiver of the present invention.

(shaped as shown in FIG. 14 and typically formed of steel or the like) to linear potentiometer 700. In order to move actuator 702 of linear potentiometer to the end of its travel, it is now necessary also to force arms 706 and 708 of spring 704 apart against the bias of the spring. Thus, a definite resistance to motion should be felt. If actuator 702 is moved from one end toward the center of its travel, a lesser frictional force should be felt until the actuator slips free of spring arms 706 and 708. In this manner a switch is simulated that appears relatively hard to open but easy to close.

Figure 11:
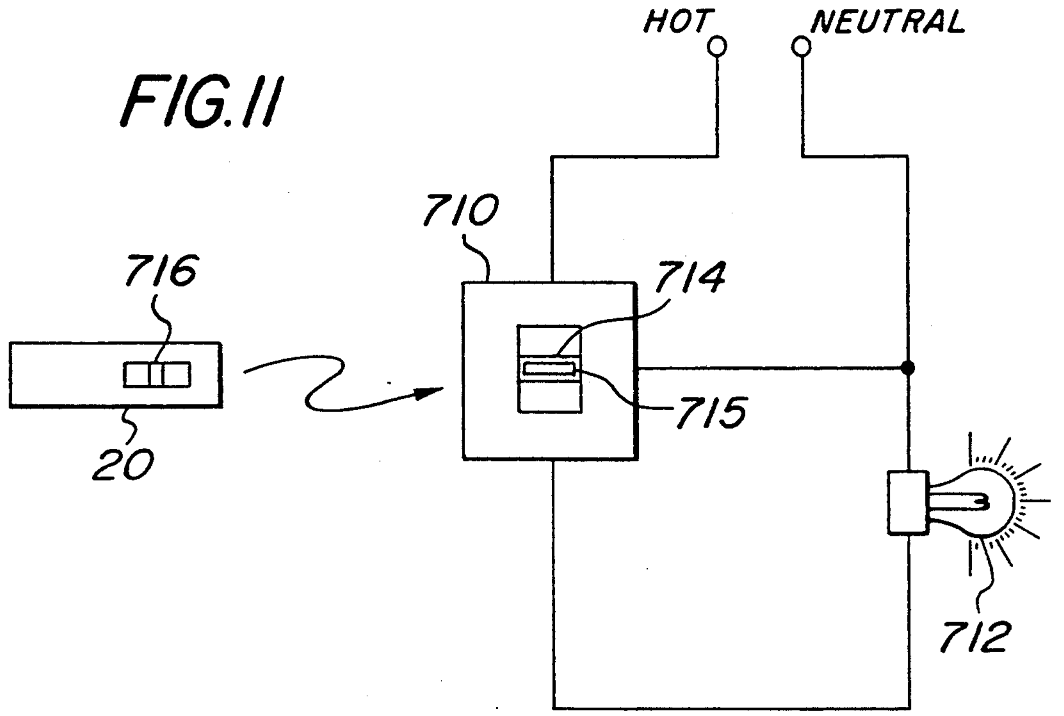
FIG. 11 is a block diagram showing an overview of an alternative power control system of the present invention.

FIG. 11 shows a preferred embodiment of a remotely controllable wallbox dimming system of the present invention. The system includes transmitter 20, for transmitting a radiant infrared control signal, and wall control/receiver 710, which allows either direct adjustment of power delivered to lighting load 712 or remote adjustment via transmitter 20. Voltage (Hot-Neutral) is applied across the series combination of lighting load 712 and wall control/receiver 710. Wall control/receiver 710 controls the power delivered to lighting load 712 in accordance with the manipulation of either wall control/receiver slide actuator 714 or transmitter slide actuator 716. Transmitter 20 sends infrared signals corresponding to the position of actuator 716 substantially instantaneously as the actuator is adjusted. The radiated signal is received by wall control/receiver 710 through lens 715, which is mounted to and movable with slide actuator 714. Control can be obtained by either wall control/receiver 710 or transmitter 20 substantially instantaneously upon manipulation of slide actuator 714 or 716, respectively.

Figure 12:
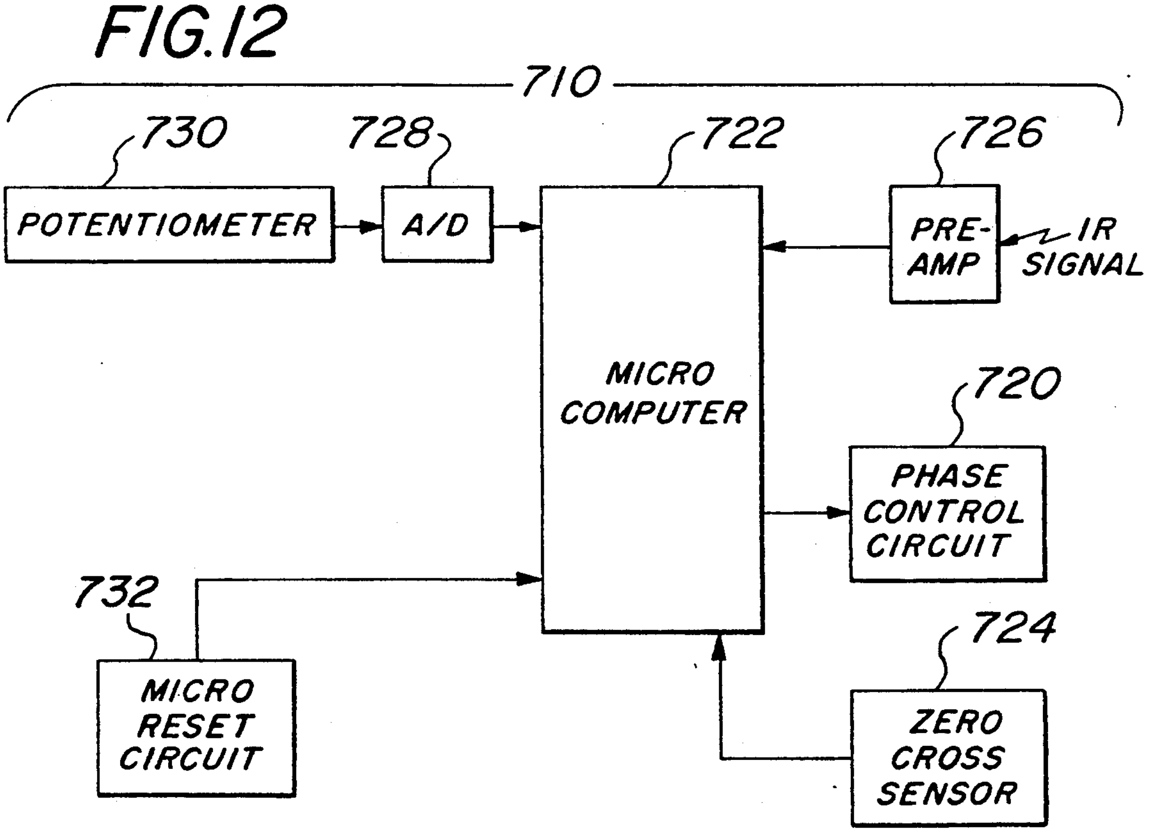
FIG. 12 is a block diagram of the wall control/receiver of the present invention.

FIG. 12 is a block diagram of a wall control/receiver of the present invention. Power to a load is adjusted according to either an infrared signal received by preamp 726 or a voltage signal from potentiometer 730, which corresponds to actuator 714. Preamp 726 receives infrared signals and transforms them into electrical signals which are input to microcomputer 722. Microcomputer 722 interprets the electrical signal from preamp 726 and controls the power delivered to a load accordingly by sending a timing signal to phase control circuit 720. The timing signal corresponds to a phase angle measured from the beginning of each half-cycle of power flow from the A.C. power source. Zero cross sensor 724 senses the beginning of each half-cycle of power flow from the A.C. source and produces an alternating digital signal which microcomputer 722 uses to set the timing signal. Alternatively, power may be adjusted via potentiometer 730, which is adjustable through a range of positions and produces a voltage output between 0 and 5 volts. A/D converter 728 samples the output of potentiometer 730 and provides an appropriate digital signal to microcomputer 722. Microcomputer 722 then sends a timing signal to phase control circuit 720 to accordingly adjust the power delivered to a load. Microcomputer 722 responds to changes in the output voltage of potentiometer 730 and preamp 726 such that control over the power delivered to a load is obtained by either potentiometer 730 or preamp 726 substantially instantaneously upon a change in output voltage of either potentiometer 730 or preamp 726. Reset circuit 732 resets microcomputer 722 in case of a malfunction or in recovering from a power failure.

Figure 13:
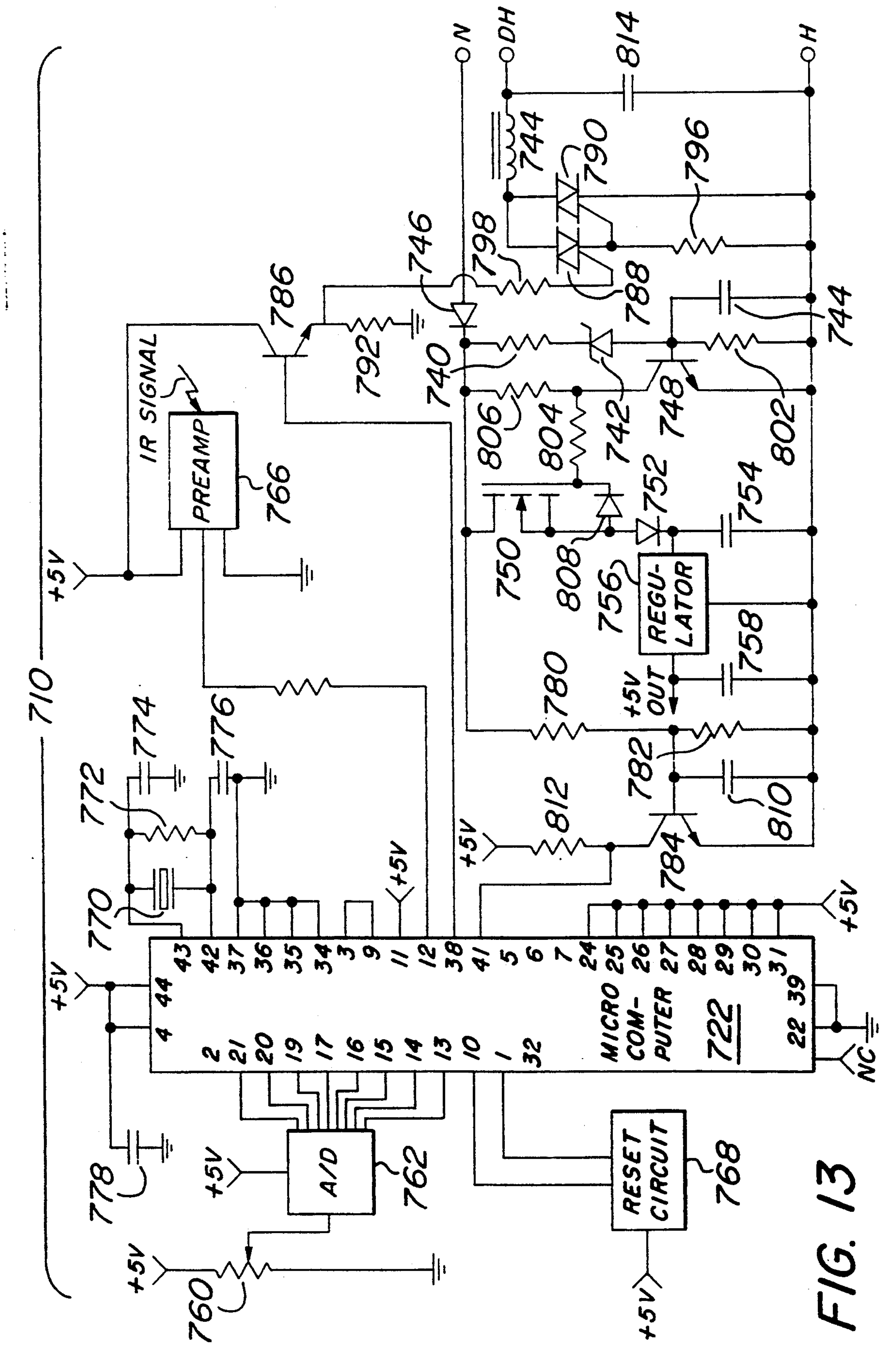
FIG. 13 is a circuit schematic of the wall control/receiver of the present invention.

FIG. 13 is a circuit schematic of the wall control/receiver of FIG. 12. During operation, line voltage is applied across resistor 740, zener diode 742 and capacitor 744. The positive half-cycle line voltage is blocked by diode 746. At the beginning of each negative half-cycle, zener diode 742 is non-conductive and the base drive to transistor 748 is essentially zero. Voltage is applied to the gate of MOSFET 750 and current flows through diode 752 charging capacitor 754. When zener diode 742 breaks down (at about 18 volts), transistor 748 thus conducts, removing voltage from the gate of MOSFET 750, shutting it off. Voltage regulator 756 allows current to flow from capacitor 754 to capacitor 758 and maintains 5 volts across capacitor 758. Capacitor 758 provides regulated voltage to potentiometer 760, A/D converter 762, microcomputer 722, preamp 766, and reset circuit 768.

Resonant crystal 770, resistor 772, and capacitors 774 and 776 comprise an oscillating circuit for setting the clock speed of microcomputer 722 (approximately 3.5 MHz). Resistor 772 is a damping resister for reducing the amplitude of circuit oscillation. Capacitors 774 and 776 attenuate unwanted higher-frequency components of crystal oscillation to limit unintentional high-frequency clock pulses to microcomputer 722. Capacitor 778 is a low pass filter which keeps the 3.5 MHz oscillating voltage from feeding back through the 5V power supply. Reset circuit 768 monitors the operation of microcomputer 722 through output pin 10 and applies voltage to reset pin 1 to reset microcomputer 722 in case of a malfunction or a power failure.

The circuit operates as follows; during each negative half-cycle, voltage is applied across series connected resistors 780 and 782, causing transistor 784 to conduct. While transistor 784 is conductive, pin 41 is pulled low. During each positive half-cycle, line voltage is blocked by diode 746 and transistor 784 is non-conductive, forcing pin 41 high. Pin 41 continues to alternate between high and low at the beginning of each new half-cycle.

Microcomputer 722 detects each zero cross by continuously monitoring pin 41. After a certain time delay following the beginning of each half cyle, microcomputer 722 produces a high bit on pin 38, which causes transistor 786, pilot triac 788, and main triac 790 to conduct, thus, providing power to a load. The average power to the load is related to the length of the time delay; the longer the delay, the less power is delivered to the load.

Microcomputer 722 calculates the time delay using inputs from either parallel input pins 13 through 21, which corresponds to the wiper voltage of potentiometer 760, or serial input on pin 12 corresponding to an infrared signal received by preamp 766. The time delay is electronically stored in microcomputer 722 and is adjusted if any of the bits 13 through 21 change or if a new transmission signal is received on pin 12.

Accordingly, power to a load can be adjusted through an essentially continuous range of levels, corresponding to either an adjustable wiper voltage on potentiometer 760 or an infrared signal received by preamp 766.

FIG. 14 is a perspective drawing of a preferred embodiment of the wall control/receiver of the present invention. Power to a load may be adjusted through a continuous range of power levels either by manipulating slide actuator 714 or, alternately, by reception of an infrared signal through lens 715, which is attached to and moves with slide actuator 714.

Figure 15:
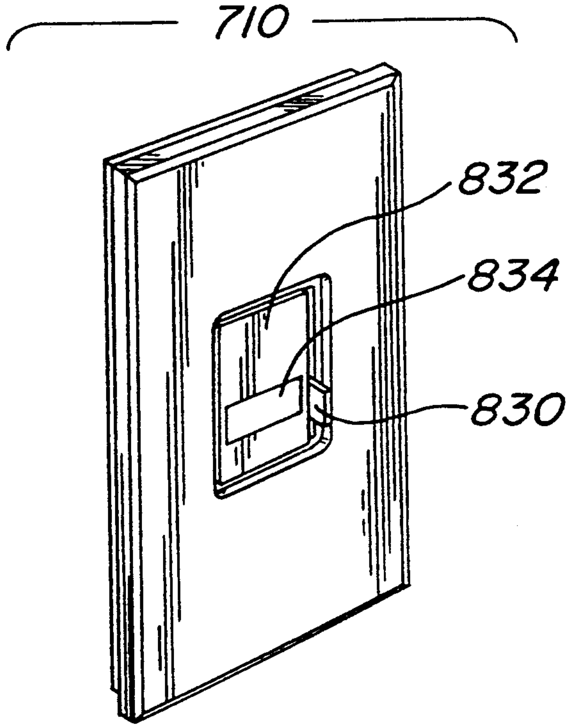
FIG. 15 is a perspective view of another preferred embodiment of the wall control/receiver of the present invention.

FIG. 15 is a perspective view of another preferred embodiment of the wall control/receiver of the present invention. Power to a load may be adjusted through a continuous range of levels by manipulating slide actuator 830. Power is alternately turned on or off by actuating push-button 832 or by the reception of an infrared signal through lens 834, which is attached to and movable with push-button 832.

Figure 16:
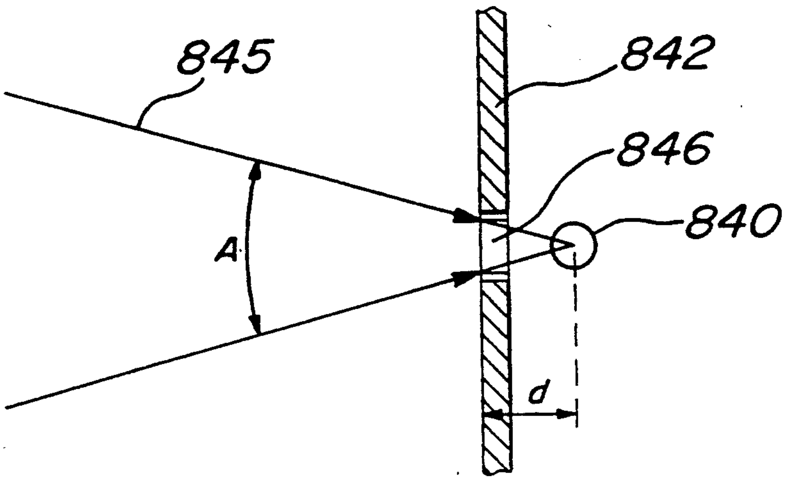
FIG. 16 (PRIOR ART)
FIG. 16 is a ray-trace diagram of a prior art optical system.

FIG. 16 depicts a prior art optical system, showing a detector 840, aperture 842, and a lens 846. Detector 840 is usually a photo-receiving diode which outputs a voltage corresponding to the intensity of an incident beam 845. Incident beam 845 is generally generated by, a remote transmitter and may be infrared, visible, ultraviolet, etc. Lens 846 is generally mounted in aperture 842 and directs incident beam 845 to detector 840, which is mounted behind aperture 842 and separated by a measurable distance (d). The receiving beam-width (A) of the prior art optical system is determined geometrically by the size of aperture 842 and the optical distance from detector 840 to aperture 842. The optical distance is equal to the measurable distance (d) divided by the relative refractive index of the transmitting medium between detector 840 and aperture 842 (which, in this case is mostly air, having a relative refractive index of 1.0) The beam-width (A) is relatively narrow in this prior art example due to the relatively large optical distance from detector 840 to aperture 846.

Figure 17:
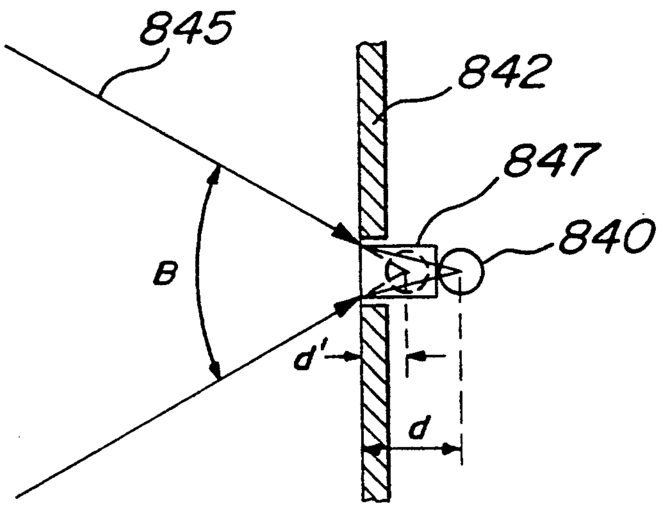
FIG. 17 is a ray-trace diagram of a wide beam-width optical system of the present invention.

FIG. 17 is a ray-trace diagram of a wide beam-width optical system of the present invention showing detector 840, aperture 842, and a lens 847. Detector 840 may be a photo-receiving diode which outputs a voltage corresponding to the intensity of an incident beam 845. Incident beam 845 may be infrared, visible ultraviolet, etc. Lens 847 preferably consists of glass, acrylic or polycarbonate, which have relative refractive indices approximately equal to 1.6. Lens materials which also attenuate optical radiation outside the optical carrier frequency bandwidth are preferred. Lens 847 is generally mounted in aperture 842 and directs incident beam 845 to detector 840, which is mounted behind aperture 842 and separated by a measurable distance (d). The expanded beam-width (B) results from decreasing the optical distance (d') from detector 840 to aperture 842 by extending lens 847 towards detector 840 such that the air-gap between lens 847 and detector 840 is minimized. Optical distance (d') is the measurable distance (d) divided by the relative refractive index of the transmitting medium (which, in this case is mostly lens 847 having a refractive index of about 1.6).

Figure 18:
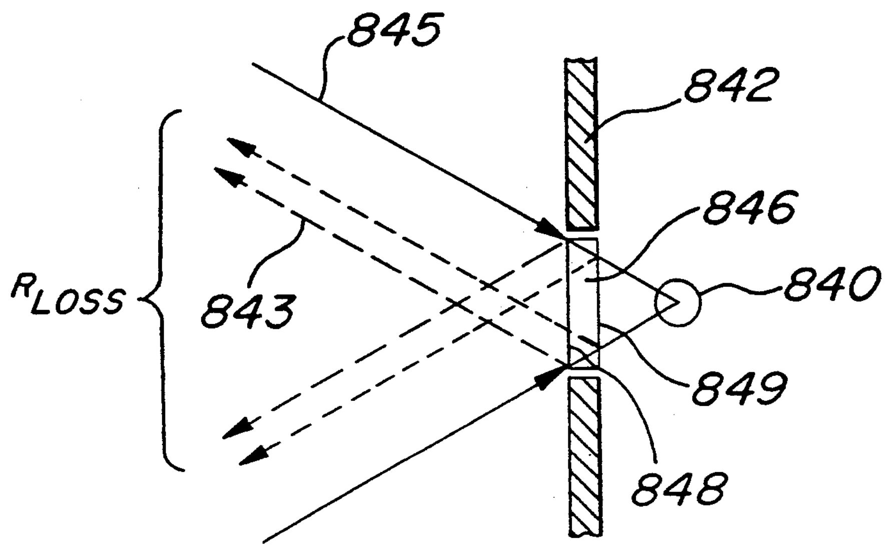
FIG. 18 (PRIOR ART)
FIG. 18 is a ray-trace diagram of a prior art optical system showing reflection losses.

FIG. 18 depicts reflection loses that afflict the prior art optical system of FIG. 16. Lens 846 is generally mounted in aperture 842 and directs incident beam 845 to detector 840, which is mounted behind aperture 842. As incident beam 845 passes through lens 846, reflected beams 843 are reflected from interfaces 848 and 849 according to Brewster's formulae (see Jenkins & White's, *Fundamentals of Optics,* Second Edition, Published by McGraw-Hill), reducing the intensity of incident beam 845 received by detector 840. Generally, as incident beam 845 passes through each interface 848 and 849, which form a junction of two dissimilar optical media, having unequal refractive indexes (e.g. glass and air), a certain percentage of the light is refracted into the interfacing medium and a certain percentage is reflected away in reflected beams 843. The amount reflected at each interface depends on whether incident beam 845 is entering a medium of higher or lower relative refractive index, and generally increases exponentially with increasing incidence angles (measured from a vector normal to the interface). The minimum amount of reflection occurs at a zero degree incidence angle.

Figure 19:
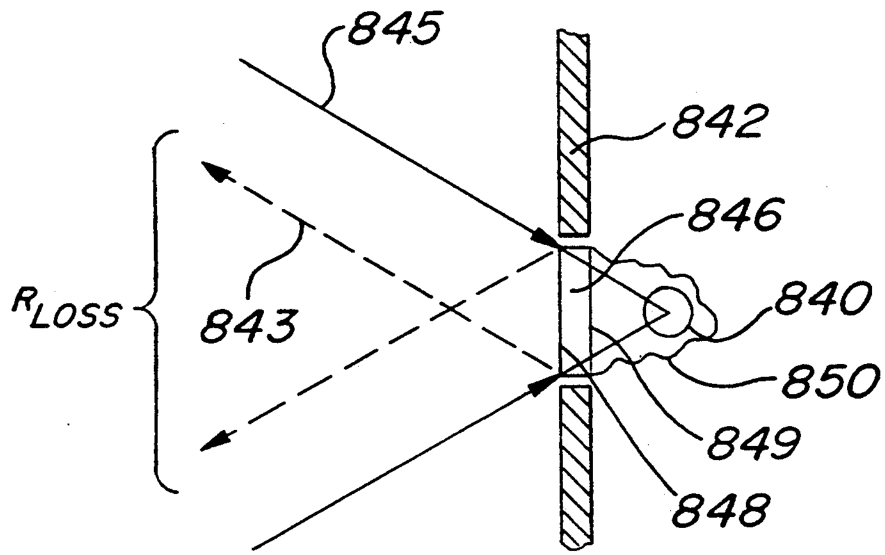
FIG. 19 is a ray-trace diagram of a low-reflection optical system of the present invention.

FIG. 19 shows an embodiment of a low-reflection optical system of the present invention showing a detector 840, aperture 842, lens 846, and a bonding medium 850. Incident beam 845 may be infrared, visible, ultraviolet, etc. Lens 846 is generally mounted in aperture 842 and directs incident beam 845 to detector 840, which is mounted behind aperture 842. Optically clear bonding medium 850 preferably has a relative refractive index approximately equal to that of lens 846 and optically connects detector 840 to lens 846, mitigating the reflection effects of interface 849. As incident beam 845 passes through lens 846, reflected beams 843 are reflected from interface 848. However, because of the optical similarity of bonding medium 850 to lens 846, substantially no reflected beams occur at interface 849, thus reducing the total amount of reflection of the optical system by about 50%.

Figure 20:
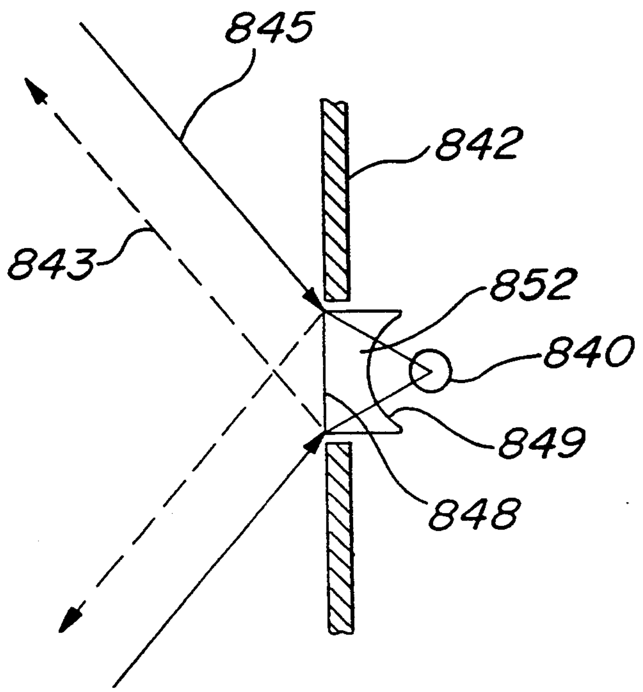
FIG. 20 is a ray-trace diagram of an alternative embodiment of a low-reflection optical system of the present invention.

FIG. 20 shows another embodiment of a low-reflection optical system of the present invention. Lens 852 is generally mounted in aperture 842 and directs incident beam 845 to detector 840, which is mounted behind aperture 842. The back surface 849 of lens 852 is either cylindrically or, preferably, spherically shaped and is concentric about the center of detector 840. As incident beam 845 passes through lens 852, reflected beams 843 are reflected from interface 848. However, because incident beam 845 enters interface 849 at essentially a zero degree incidence angle (as measured from a vector normal to interface 849 at the point of incidence), substantially no reflected beams occur at interface 849, thus reducing the total amount of reflection of the optical system by about 50%. This particular embodiment is especially useful when lens 852 must be removable or when lens 852 and aperture 842 are part of of a moving element, such as a button or a slide actuator. An alternative embodiment (not shown) includes a second lens having a curved surface separated from back surface 849 by a small gap, the second lens preferably being bonded to detector 840 via an optically clear bonding medium.

Figure 21:
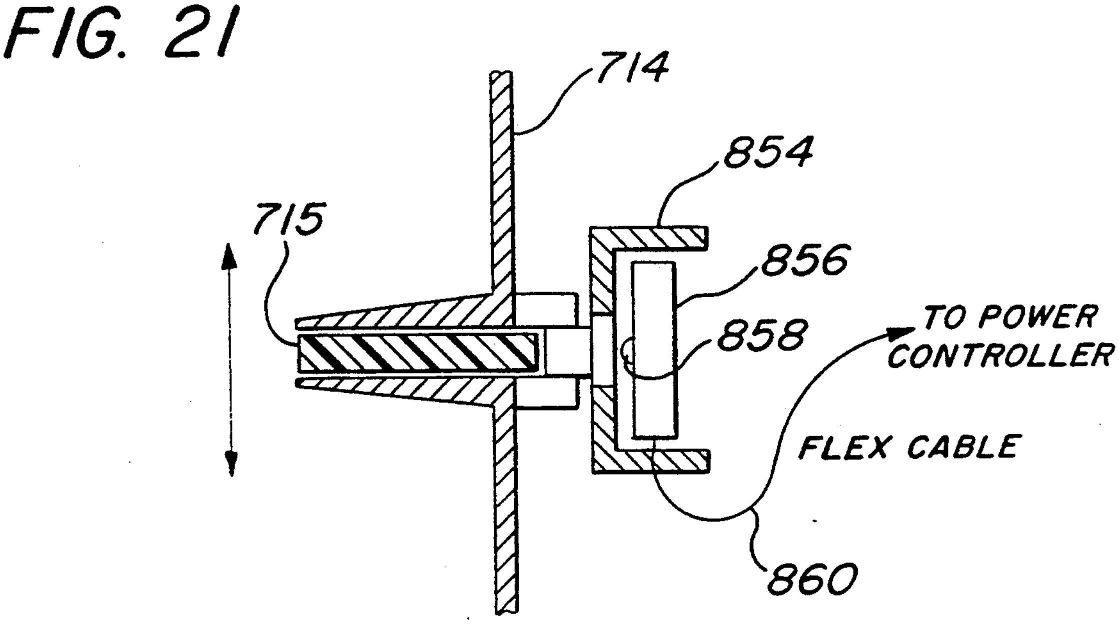
FIG. 21 is a vertical cross section of a slide actuator, lens and receiver of the wall control/receiver of FIG. 14.

FIG. 21 shows a vertical cross section of slide actuator, lens and receiver of the wall control/receiver of of FIG. 14. Lens 715 is mounted in and moves with slide actuator 714. Lens 715 preferably consists of glass, acrylic or polycarbonate, which have relative refractive indices approximately equal to 1.6. Lens materials which also attenuate optical radiation outside the optical carrier frequency bandwidth are preferred. Cradle 854 moves with slide actuator 714 and supports receiver 856. Detector 858, which is preferably a photo-diode, is mounted on and electrically connected to receiver 856, which may be an amplier, preamplifier, decoder etc. The entire assembly is mounted on wall control/receiver 710, as shown in FIG. 14, such that it translates up or down in response to an applied force on slide actuator 714. Flex cable 860 electrically connects receiver 856 to the power control circuit (not shown) which controls power to a load. Radiant infrared control signals from a remote control transmitter enter lens 715 and strike detector 858, producing an electrical control signal. Receiver 856 responds to the electrical signal and communicates power settings to the power controller via flex cable 860.

It should be apparent to one skilled in the art that, although the implementation hereinbefore described employs an infrared communications link between the transmitter and receiver, that link can readily be provided as an audio, ultrasonic, microwave or radio frequency link as well. It should also be apparent to one skilled in the art that it is possible to have multiple transmitters, each operating on a different channel contained within the same housing, and corresponding receivers for each transmitter. Alternatively, the system may use one transmitter that can be set to operate on each of a number of different channels by using a selector switch. Furthermore, the signal between the transmitter and the receiver can be an amplitude-modulated, frequency-modulated, phase-modulated, pulse width-modulated or digitally encoded signal.

Since these and certain other changes may be made in the above apparatus and method without departing from the scope of the invention herein involved, it is intended that all matter contained in the above description or shown in the accompanying drawings shall be interpreted in an illustrative and not a limiting sense.

We claim:

1. A remotely controllable power control system comprising, in combination:
- a) means for transmitting a radiant control signal, including a first actuator means for determining said signal, and
- b) wallbox mountable control/receiver means to control the power delivered to a load comprising, in combination:
  - i) detector means responsive to said radiant control signal for providing a first power control signal determined by said radiant control signal,
  - ii) second actuator means positionable through a continuous range for determining a second power control signal, said second actuator means is movable to move along a substantially linear path for determining said second power control signal, said second actuator means comprising a lens which is for receiving said radiant control signal, said second actuator means being removable from said wallbox mountable control/receiver means and
  - iii) means responsive to both said first and second power control signals for controlling the amount of power delivered to said load in accordance with a selected one of said first and second power control signals.

2. The power control system of claim 1 wherein said radiant control signal is infrared radiation.

3. The power control system of claim 2 wherein said first actuator means is positionable along a substantially linear path, for determining said radiant control signal.

4. The power control system of claim 3 wherein said radiant control signal is digitally encoded.

5. The power control system of claim 4 wherein power to said load is set in accordance with said second actuator means substantially instantaneously upon actuation of said second actuator means.

6. The power control system of claim 5 wherein said wallbox mountable control/receiver means comprises a microcomputer.

7. A remotely controllable power control system comprising, in combination:
- a) means for transmitting a radiant control signal, including a first actuator means for determining said signal, and
- b) wallbox mountable control/receiver means to control the power delivered to a load comprising, in combination:
  - i) detector means responsive to said radiant control signal for providing a first power control signal determined by said radiant control signal,
  - ii) second actuator means positionable through a continuous range for determining a second power control signal, said second actuator means comprising a lens for receiving said radiant control signal, said second actuator means being removable from said wallbox mountable control/receiver means
  - iii) means responsive to both said first and second power control signals for controlling the amount of power delivered to said load in accordance with a selected one of said first and second power control signals, and
  - iv) a push-button.

8. A remotely controllable power control system comprising, in combination:
- a) means for transmitting a radiant control signal, including a first actuator means for determining said signal, and
- b) wallbox mountable control/receiver means to control the power delivered to a load comprising, in combination:
  - i) detector means responsive to said radiant control signal for providing a first power control signal determined by said radiant control signal,
  - ii) second actuator means positionable through a continuous range for determining a second power control signal, said second actuator means comprising a lens which is for receiving said radiant control signal, said second actuator means being removable from said wallbox mountable control/receiver means and
  - iii) means responsive to both said first and second power control signals for controlling the amount of power delivered to said load in accordance with a selected one of said first and second power control signals.

9. The power control system of claim 8 wherein said radiant control signal is infrared radiation.

10. A remotely controllable power control system comprising, in combination:
- a) means for transmitting a radiant control signal, including a first actuator means for determining said signal, and
- b) wallbox mountable control/receiver means to control the power delivered to a load comprising, in combination:
  - i) detector means responsive to said radiant control signal for providing a first power control signal determined by said radiant control signal,
  - ii) second actuator means positionable through a continuous range for determining a second power control signal, said second actuator means being removable from said wallbox mountable control/receiver means and
  - iii) means responsive to both said first and second power control signals for controlling the amount of power delivered to said load in accordance with a selected one of said first and second power control signals.

11. The power control system of claim 10 wherein said second actuator means is movable along a substantially linear path, for determining said second power control signal.

12. The power control system of claim 10 wherein said wallbox mountable control/receiver means further comprises a push-button.

13. A remotely controllable power control system comprising, in combination:

a) means for transmitting a radiant control signal, including a first actuator means for determining said radiant signal, and b) wallbox mountable control/receiver means comprising in combination:

i) detector means for providing a first power control signal determined by said radiant control signal, ii) lens means for directing said radiant control signal to said detector means, said lens means being substantially in intimate contact with said detector means and movable therewith, iii) a second actuator means operable for determining a second power control signal, and c) means for controlling the power delivered to said load in accordance with a selected one of said first and second power control signals.

14. The power control system of claim 13 wherein said first actuator means is positionable along a substantially linear path, for determining said radiant control signal.

15. The power control system of claim 14 wherein said radiant control signal is infrared radiation.

16. The power control system of claim 14 wherein said second actuator means is movable to move along a substantially linear path, for determining said second power control signal.

17. The power control system of claim 13 wherein said first actuator means comprises a push-button.

18. The power control system of claim 17 wherein said radiant control signal is infrared radiation.

19. The power control system of claim 17 wherein said second actuator means comprises a push-button.

20. The power control system of claim 17 wherein said second actuator means is movable along a substantially linear path, for determining said second power control signal.

21. The power control system of claim 20 wherein said wallbox mountable control/receiver means further comprises a push-button.

22. The power control system of claim 13 wherein said first actuator means comprises a first push-button for increasing the power delivered to said load and a second push-button for decreasing the power delivered to said load.

23. The power control system of claim 22 wherein said radiant control signal is infrared radiation.

24. The power control system of claim 22 wherein said second actuator means comprises a push-button.

25. The power control system of claim 13 wherein said first actuator means comprises a pressure-operated position sensing means.

26. The power control system of claim 13 wherein said radiant control signal is infrared radiation.

27. The power control system of claim 13 wherein said radiant control signal is digitally encoded.

28. The power control system of claim 27 wherein said first actuator means is positionable along a substantially linear path, for determining said radiant control signal.

29. The power control system of claim 27 wherein said second actuator means is movable along a substantially linear path, for determining said second power control signal.

30. The power control system of claim 27 wherein said radiant control signal is infrared radiation.

31. The power control system of claim 13 wherein said radiant control signal is pulse-width modulated.

32. The power control system of claim 13 wherein said second actuator means is movable along a substantially linear path, for determining said second power control signal.

33. The power control system of claim 32 wherein said wallbox mountable control/receiver means further comprises a push-button.

34. The power control system of claim 33 wherein said radiant control signal is infrared radiation.

35. The power control system of claim 32 wherein said radiant control signal is infrared radiation.

36. The power control system of claim 13 wherein said second actuator means is rotatable about a substantially fixed axis when displaced.

37. The power control system of claim 13 wherein said second actuator means comprises a push-button.

38. The power control system of claim 37 wherein said second actuator means and said lens means are a single element.

39. The power control system of claim 37 wherein said radiant control signal is infrared radiation.

40. The power control system of claim 13 wherein said wallbox mountable control/receiver means includes means for independently controlling the power delivered to a plurality of loads.

41. The power control system of claim 40 wherein said first actuator means means comprises a push-button.

42. The power control system of claim 40 wherein said second actuator means is movable along a substantially linear path, for determining said second power control signal.

43. The power control system of claim 42 wherein said wallbox mountable control/receiver means further comprises a push-button.

44. The power control system of claim 40 wherein said first actuator means is positionable along a substantially linear path, for determining said radiant control signal.

45. The power control system of claim 13 wherein said lens means comprises a second lens located behind a first lens.

46. The power control system of claim 45 wherein said second lens comprises a substantially spherical surface.

47. The power control system of claim 13 wherein said second actuator means and said lens means comprise a single element.

48. A remotely controllable power control system comprising, in combination:

a) means for transmitting a radiant control signal, b) wallbox mountable control/receiver means for receiving said radiant control signal comprising, in combination:

i) detector means for providing a power control signal determined by said radiant signal, mounted behind an aperture means, and ii) an optically transmitting lens, which substantially occupies the entire space between said detector means and said aperture means, for directing said radiant signal to said detector means, and c) means for selectively controlling the amount of power delivered to said load in accordance with said power control signal.

49. The power control system of claim 48 wherein said wallbox mountable control/receiver means comprises an actuator means movable to determine power to said load.

50. The power control system of claim 49 wherein said lens moves with said actuator means.

51. The power control system of claim 50 wherein said actuator means is movable along a substantially linear path, for determining the power delivered to said load.

52. The power control system of claim 51 wherein said actuator means is removable from said wallbox mountable control/receiver means.

53. The power control system of claim 50 wherein said actuator means comprises a push-button.

54. The power control system of claim 50 wherein said wallbox mountable control/receiver means further comprises a push-button.

55. The power control system of claim 49 wherein said actuator means is movable along a substantially linear path, for determining the power delivered to said load.

56. The power control system of claim 55 wherein said wallbox mountable control/receiver means further comprises a push-button.

57. The power control system of claim 56 wherein said actuator means is removable from said wallbox mountable control/receiver means.

58. The power control system of claim 56 wherein said radiant control signal is infrared radiation.

59. The power control system of claim 56 wherein said lens has a front surface that is substantially shaped like a section of a cylinder.

60. The power control system of claim 55 wherein said actuator means is removable from said wallbox mountable control/receiver means.

61. The power control system of claim 55 wherein said radiant control signal is infrared radiation.

62. The power control system of claim 49 wherein said actuator means is rotatable about a substantially fixed axis when displaced.

63. The power control system of claim 49 wherein said actuator means comprises a push-button.

64. The power control system of claim 63 wherein said actuator means is removable from said wallbox mountable control/receiver means.

65. The power control system of claim 63 wherein said radiant control signal is infrared radiation.

66. The power control system of claim 63 wherein said lens has a front surface that is substantially shaped like a section of a cylinder 67. The power control system of claim 49 wherein said actuator means is removable from said wallbox mountable control/receiver means.

68. The power control system of claim 48 wherein said radiant control signal is infrared radiation.

69. The power control system of claim 68 wherein said lens has a front surface that is substantially shaped like a section of a cylinder.

70. The power control system of claim 69 further comprising an optically transmissive bonding means for optically bonding said detector means to said lens.

71. The power control system of claim 48 further comprising an optically transmissive bonding means for optically bonding said detector means to said lens.

72. A remotely controllable power control system comprising, in combination:

a) means for transmitting a radiant control signal, b) wallbox mountable control/receiver means for receiving said radiant control signal comprising, in combination:

i) detector means for providing a power control signal determined by said radiant signal, mounted behind an aperture means, and ii) an optically transmitting lens comprising a cylindrical surface that is substantially concentric about a vertical axis through said detector means, for directing said radiant control signal to said detector means, and c) means for controlling the power delivered to said load in accordance with said power control signal.

73. The power control system of claim 72 wherein said wallbox mountable control/receiver means comprises an actuator means movable for determining the power delivered to said load.

74. The power control system of claim 73 wherein said actuator means is movable along a substantially linear path.

75. The power control system of claim 74 wherein said actuator means is removable from said wallbox mountable control/receiver means.

76. The power control system of claim 75 wherein said lens moves with said actuator means.

77. The power control system of claim 74 wherein said lens moves with said actuator means.

78. The power control system of claim 74 wherein said wallbox mountable control/receiver means further comprises a push-button.

79. The power control system of claim 78 wherein said actuator means is removable from said wallbox mountable control/receiver means.

80. The power control system of claim 78 wherein said lens moves with said actuator means.

81. The power control system of claim 80 wherein said actuator means is removable from said wallbox mountable control/receiver means.

82. The power control system of claim 73 wherein said actuator means is rotatable about a substantially fixed axis when displaced.

83. The power control system of claim 73 wherein said actuator means comprises a push-button.

84. The power control system of claim 83 wherein said actuator means is removable from said wallbox mountable control/receiver means.

85. The power control system of claim 83 wherein said lens moves with said actuator means.

86. The power control system of claim 85 wherein said actuator means is removable from said wallbox mountable control/receiver means.

87. The power control system of claim 73 wherein said actuator means is removable from said wallbox mountable control/receiver means.

88. The power control system of claim 73 wherein said lens moves with said actuator means.

89. The power control system of claim 88 wherein said actuator means is removable from said wallbox mountable control/receiver means.

90. The power control system of claim 89 wherein said radiant control signal is infrared radiation.

91. The power control system of claim 72 wherein said radiant control signal is infrared radiation.

92. The power control system of claim 72 wherein said lens has a front surface that is substantially shaped like a section of a cylinder.

93. The power control system of claim 72 wherein said actuator means and said lens means comprise a single element.

94. A remotely controllable power control system comprising, in combination:

a) transmitting means, comprising a first actuator means linearly positionable through a continuous range of positions, for transmitting a digitally encoded infrared control signal, b) wallbox mountable control/receiver means for controlling the power delivered to a lighting load comprising, in combination:

i) detector means for providing a first power control signal determined by said infrared control signal, mounted behind ii) a lens, having a cylindrical back surface which is substantially concentric about a vertical axis through said detector means, for directing said infrared signal to said detector means, mounted to iii) a second actuator means, linearly positionable through a continuous range of positions, for providing a second power control signal, and iv) means for selectably controlling the amount of power delivered to said load in accordance with said first or second power control signal;

wherein power to said load is set in accordance with the position of either said first or second actuator means substantially instantaneously upon positioning, respectively, of said first or second actuator means.

95. A remotely controllable power control system comprising, in combination:

a) transmitting means, comprising a first switch actuator means, for transmitting a digitally encoded infrared control signal, and b) wallbox mountable control/receiver means for controlling the power delivered to a lighting load comprising, in combination:

i) detector means for providing a first power control signal determined by said infrared control signal, mounted behind ii) a lens, having a front surface which is shaped like a section of a cylinder, said lens substantially in intimate contact with said detector means, for directing said infrared signal to said detector means, mounted to iii) a second switch actuator means, for providing a second power control signal, and iv) means for alternately turning the power to said load on or off in accordance with either said first or second power control signal;

wherein power to said load is alternately turned on, to a predetermined level, or off in accordance with the actuation of either said first or second switch actuator.

96. A remotely controllable power control system comprising, in combination:

a) transmitting means, comprising a first switch actuator means, for transmitting a digitally encoded infrared control signal, and b) wallbox mountable control/receiver means for controlling the power delivered to a lighting load comprising, in combination:

i) detector means for providing a first power control signal determined by said infrared control signal, mounted behind ii) a lens, having a front surface which is shaped like a section of a, cylinder for directing said infrared signal to said detector means, mounted to iii) a second switch actuator means, for providing a second power control signal, iv) actuator means, positionable through a continuous range, for providing a third power control signal, and v) means for setting the level of power delivered to said load in accordance with said third power control signal, and alternately turning the power to said load on or off in accordance with either said first or second power control signal;

wherein power to said load is alternately turned on, to a level corresponding to the position of said positionable actuator means, or off in accordance with the actuation of either said first or second switch actuator.

* * * * *